US008947258B2

(12) United States Patent  (10) Patent No.: US 8,947,258 B2
Pant et al.  (45) Date of Patent: Feb. 3, 2015

(54) RELIABLE, LONG-HAUL DATA COMMUNICATIONS OVER POWER LINES FOR METER READING AND OTHER COMMUNICATIONS SERVICES

(75) Inventors: Ranjan Pant, Beltsville, MD (US); Andrew G. Reid, Frederick, MD (US)

(73) Assignee: PowerMax Global LLC, Beltsville, MD (US)

( * ) Notice: Subject to any disclaimer, the term of this patent is extended or adjusted under 35 U.S.C. 154(b) by 942 days.

(21) Appl. No.: 13/057,948

(22) PCT Filed: Aug. 10, 2009

(86) PCT No.: PCT/US2009/053279
§ 371 (c)(1),
(2), (4) Date: Feb. 7, 2011

(87) PCT Pub. No.: WO2010/017549
PCT Pub. Date: Feb. 11, 2010

(65) Prior Publication Data
US 2011/0140911 A1   Jun. 16, 2011

Related U.S. Application Data

(60) Provisional application No. 61/087,444, filed on Aug. 8, 2008.

(51) Int. Cl.
*G08B 23/00* (2006.01)
*H04B 3/58* (2006.01)
*H04B 3/54* (2006.01)

(52) U.S. Cl.
CPC ............ *H04B 3/58* (2013.01); *H04B 3/546* (2013.01); *H04B 2203/5466* (2013.01)
USPC ................. 340/870.02; 340/870.01

(58) Field of Classification Search
USPC .................................. 340/870.02
See application file for complete search history.

(56) References Cited

U.S. PATENT DOCUMENTS

| 7,064,654 | B2 * | 6/2006 | Berkman et al. ............... 375/259 |
| 7,436,321 | B2 * | 10/2008 | White et al. ............. 340/870.02 |
| 2004/0134565 | A1 | 7/2004 | Sun et al. |
| 2008/0143491 | A1 | 6/2008 | Deaver |

FOREIGN PATENT DOCUMENTS

CN  101076967 A  11/2007

OTHER PUBLICATIONS

Office Action issued in Chinese Patent Application No. 200980140597.7 dated Apr. 4, 2013.

* cited by examiner

*Primary Examiner* — Kerri McNally
(74) *Attorney, Agent, or Firm* — Venable LLP; Michael A. Sartori; Todd R. Farnsworth

(57) ABSTRACT

A system, method and computer program product provides for power line communications (PLC) over electric power lines includes a device mountable near an electrical distribution transformer (DT) to provide a high speed interface and communicates with one or multiple access devices, which provide low speed interfaces for analog signals or digital signals over RS 232, RS 485, optical, wireless and Ethernet. The device transmits data to/from these access devices over the electric lines to other repeaters over one or more wires of an electrical line or over multiple lines, and serves to strengthen and improve signal quality. Upon detecting a wire or line is having problems carrying data, the data is sent over other wires, and upon power line failures, wireless backup to mobile/GSM and WiMax networks is utilized. The device permits utilities and others to read electric meters, monitor the power quality of the distribution grid and detect power losses/failures/outages, and permits telecom service providers and others to provide a communications link to cell phone towers, WiFi Access Points and enable broadband Internet and telephony in rural, remote or sparely populated areas.

22 Claims, 16 Drawing Sheets

RELIABLE, LONG-HAUL DATA COMMUNICATIONS OVER POWER LINES FOR METER READING AND OTHER COMMUNICATIONS SERVICES

CROSS-REFERENCE TO RELATED APPLICATIONS

The present application is a U.S. National Stage Application of International Patent Application No. PCT/US2009/053279 filed Aug. 10, 2009, which claims the benefit of U.S. Provisional Patent Application No. 61/087,444, filed Aug. 8, 2008, entitled "Reliable, Long-Haul Data Communications over Power Lines for Meter Reading and Other Communications Services," both of which are herein incorporated by reference in their entirety.

BACKGROUND

1. Field

Exemplary embodiments relate generally to communications and more particularly to communications over power systems.

2. Related Art

Power line communication (PLC) refers to systems for carrying data on conductors typically used for electric power transmission. Alternative terminologies for PLC include power line carrier, mains communication, power line telecommunications (PLT) and power line networking (PLN).

In these systems, electrical power may be transmitted over high voltage transmission lines, distributed over medium voltage, and used inside buildings typically at lower voltages. Powerline communications can also be applied at each stage. Often, PLC systems are limited to a single set of wires, such as premises wiring, though there are systems which can cross between two levels, such as the distribution network and the premises wiring.

Typically, PLC systems operate by providing a modulated carrier signal on the wiring system. Different types of powerline communications may use differing frequency bands, depending on the signal transmission characteristics of the power wiring used. Power wire circuits have a limited ability to carry higher frequencies because power wiring systems were originally intended for transmission of AC power. The propagation problem is a limiting factor for each type of power line communications.

The data rates over power line communication systems may vary widely. For example, low-frequency (100-200 kHz) carriers on high-voltage transmission lines may carry one or two analog voice circuits, or alternatively, control and/or telemetry circuits with an equivalent data rate. Such circuits may be numerous kilometers long. Higher data rates are available, but generally have shorter ranges. For example, a local area network (LAN) may operate at megabits per second (Mbps) and would cover perhaps a single floor of a building.

Broadband over power lines (BPL) uses PLC by receiving and sending radio signals over power lines to provide access to the networks, such as the Internet. A BPL system may utilize, for example, the overhead medium voltage (MV) or low voltage (LV) power lines to transmit multi-Mbps data signals. However, these systems may suffer from some major drawbacks.

For one, as noted they have a limited range, after which a signal repeater is required. However, repeating the signals in an overhead power line environment, for example, is a problem as the regenerated signal interferes with the original signal and reduces the overall bandwidth.

Secondly, such systems are inherently unreliable. Their communications capability may be disrupted when a power line fails, for example, due to line faults, equipment malfunctions, failures caused by weather/lightning strike, overloaded transformers, blown fuses or other causes.

Consequently, utilities, and notably the electric utilities, need a reliable carrier class communications system with high availabilities, and which can reach longer distances in cities/suburbs and rural/remote areas. Such systems, and accompanying methods, are needed and desired to manage and control the millions of devices on the power distribution grid.

SUMMARY

The embodiments provide a highly reliable and long-haul and high capacity, high speed communications system. The system may utilize power lines uniquely integrated with other communications technologies and with integrated interfaces for meter reading, power quality monitoring and load management while providing broadband data and voice communications for the utilities and their customers.

In certain exemplary embodiments, systems, methods and computer program products herein provide the ability to send/receive data over multiple medium voltage (MV) or low voltage (LV) power lines in a load-sharing manner, thus providing higher aggregate data rates.

In certain exemplary embodiments, systems, methods and computer program products herein provide the ability to provide greater reliability. For example, if data communications fails over one power line or phase, in certain embodiments a unit may automatically switch to another power line without interrupting the communications.

In certain exemplary embodiments, systems, methods and computer program products herein provide the ability to repeat data traffic without causing any loss of bandwidth. This may be accomplished, for example, by "spatial frequency division multiplexing," using a different set of frequencies on the input and output side of an exemplary repeater, by allowing for the repeater inputs and outputs to be connected on different power lines and/or phases, and/or providing inventive improvements to known couplers.

In certain exemplary embodiments, systems, methods and computer program products herein provide the ability to repeat data traffic without causing any loss of bandwidth and/or reducing loss of bandwidth. In certain embodiments, this may be accomplished by using inventive couplers whereby the repeated signals do not interfere with and/or minimally interfere with an original signal and/or signals.

In certain exemplary embodiments, systems, methods and computer program products herein provide the ability to provide low speed data ports on exemplary repeaters for interfacing to utility devices, such as electric meters, power quality monitoring devices, switches and/or other devices anywhere on a power distribution grid and/or elsewhere.

In certain exemplary embodiments, systems, methods and computer program products herein provide reliable communications of command and/or control messages using an automatic backup transmission from exemplary repeaters via the mobile/cellular/wireless networks in case of power line failures.

In certain exemplary embodiments, systems, methods and computer program products herein provide quasi-static carrier frequency planning for managing frequency assignments and signal gain on segments of power lines based on geographical areas.

In certain exemplary embodiments, systems, methods and computer program products herein provide fiber "add and/or drop" or Ethernet access capability on a single and/or numerous (any) exemplary repeater at any location on the power lines, for example.

In certain exemplary embodiments, systems, methods and computer program products herein provide for communicating with multi-vendor electric meters and sensors.

In certain exemplary embodiments, systems, methods and computer program products herein provide an optical interface adaptation for electric meters with optical LED ports.

In certain exemplary embodiments, systems, methods and computer program products herein provide an asynchronous packet assembly/disassembly algorithm for communications with non-standard electric meters.

In certain exemplary embodiments, systems, methods and computer program products herein provide a secure bandwidth sharing logical network overlay for multiple service providers sharing, for example, MV or LV power lines.

In certain exemplary embodiments, systems, methods and computer program products herein provide a mobile/wireless communication backup channel for network management.

In certain exemplary embodiments, systems, methods and computer program products herein provide power line failure and outage notification using mobile/wireless backup channel.

In certain exemplary embodiments, systems, methods and computer program products herein provide seamless MV line to fiber optic cable bridges for using existing fiber links or underground segments to buildings which have one or more distribution transformers in-building;

In certain exemplary embodiments, systems, methods and computer program products herein provide hybrid wireless and/or power line communications for load management (LM) inside the customer premises;

In certain exemplary embodiments, systems, methods and computer program products herein provide integrated PLC capability for user premise backup power supply devices, such as voltage stabilizers, inverters, and uninterruptible power supply (UPS), for example.

In certain exemplary embodiments, systems, methods and computer program products herein provide integrated PLC communication capability for "tower-power" backup power supply used in mobile/cellular towers.

In certain exemplary embodiments, systems, methods and computer program products herein provide the ability to make and receive phone calls, monitor safety devices such as smoke alarms, make audio announcements inside customer premises and common areas in a multi-dwelling unit (MDU)

Further features and advantages of, as well as the structure and operation of, various embodiments, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF EMBODIMENTS OF THE EMBODIMENTS

Figure 1:
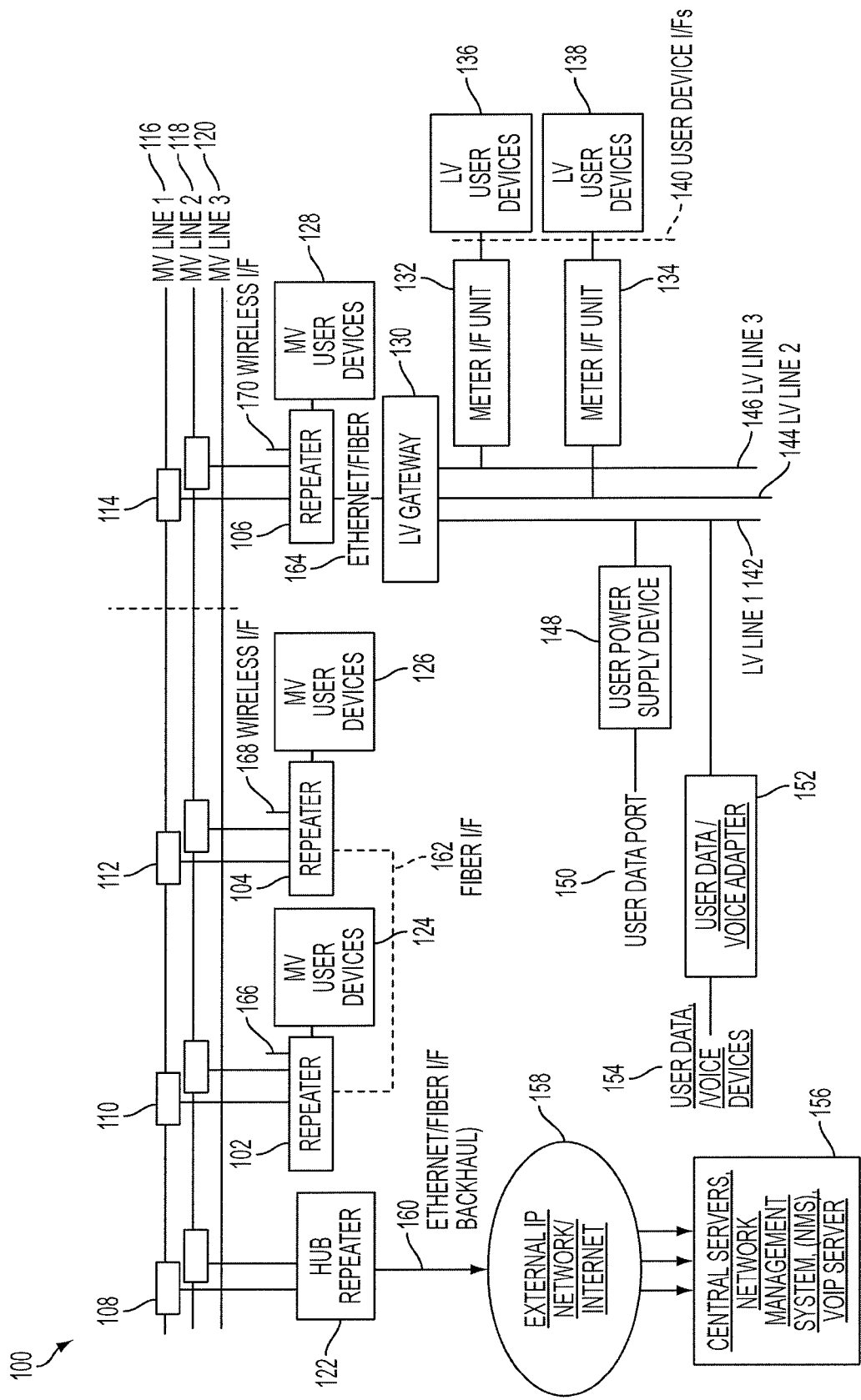
FIG. 1 is a functional block diagram of the present embodiments showing an exemplary system and exemplary external interfaces and communication links.

Various exemplary embodiments are discussed in detail below including a preferred embodiment. While specific implementations are discussed, it should be understood that this is done for illustration purposes only. A person skilled in the relevant art can recognize that the systems, methods and features provided herein may be used without parting from the spirit and scope of the invention. Furthermore, any and all references cited herein shall be incorporated herein by reference in their respective entireties.

TABLE OF CONTENTS

I. OVERVIEW
II. POWER LINE COMMUNICATION (PLC) SYSTEM
III. REPEATER (102-106, 122)
IV. METER INTERFACE UNIT (132, 134)
V. USER POWER SUPPLY UNIT (148)
VI. BROADBAND EMBODIMENT
VIII. LV GATEWAY AND ADAPTER
IX. EXEMPLARY BASIC COMMUNICATIONS PROCESS
X. EXEMPLARY METER READING FLOW PROCESSING
XI. EXEMPLARY REMOTE DISCONNECT PROCESS
XII. EXEMPLARY CUSTOMER USE OF COMMUNICATIONS
XIII. EXEMPLARY POWER OUTAGE PROCESSING
IX. EXEMPLARY PROCESSING AND COMMUNICATIONS EMBODIMENTS

I. Overview

In one or more embodiments, a method, system and corresponding computer program product are provided for data transport over electric power lines, such as medium voltage (MV) and low voltage (LV) power lines. For example, the embodiments may relate to a unit shown as an exemplary repeater 102, 104, 106 and/or 122 in FIG. 1 and further described below, which may, for example, be mounted near an electrical distribution transformer or any location with access to a medium voltage power line.

In exemplary embodiments, the exemplary repeater 102, 104, 106 and/or 122 may provide a high speed fiber optic interface and one or multiple low speed interfaces such as, for example, RS 232, RS 485, optical and Ethernet interfaces. A variety of external equipment, such as for example, electric meters, power quality monitoring devices, electronic signage, WiFi (wireless fidelity) access point devices, mobile/GSM (Groupe Special Mobile) base transceiver stations (BTS), or low voltage (LV) gateways, to name a few, from one or more different manufacturers, can be connected to this exemplary repeater unit using these standard interfaces.

The repeater may transmit the data to/from these access devices over a line, such as an MV power line 116, 118, 120, to other repeaters connected to the MV power line. The foregoing is an exemplary embodiment, as any other power lines, including low voltage (LV) power lines. In exemplary embodiments, the data can be sent, for example, over one wire (also termed a line, or a "phase") or two or three or more wires (lines or phases) of the MV line in a load-sharing manner.

In an exemplary embodiment, if the repeater detects that one power line (or phase) is having a problem carrying the data, the repeater may automatically send the data over one or more other MV wires, providing a robust system with built-in redundancy. In exemplary embodiments, in case of power line failures, the repeater may provide a backup interface, such as exemplary backup wireless interface 170, to communicate via commonly available wireless services, such as for example, mobile/GSM and/or WiMAX (Worldwide Interoperability for Microwave Access) networks. The exemplary repeater may also provide one or more DC/AC power supplies for powering external equipment, such as for example, WiFi access points.

The embodiments include unique repeater capability permitting data to travel longer distances on power lines, such as for example, on MV power lines. In exemplary embodiments, the repeater may be utilized by utilities and/or other entities to, for example, read electric meters, monitor the power quality of the distribution grid and/or detect failures/outages, to name a few capabilities. In exemplary embodiments, telecom and wireless service providers may be provided backhaul links 160 between cell phone towers, to for example, provide city-wide WiFi Access Points and broadband Internet and telephony in rural/remote and/or scarcely populated areas.

In exemplary embodiments, for example, the utility companies and/or other entities may reliably and/or remotely transmit and/or receive data, including internal data. Examples include sending and/or receiving data relating to automated meter reading (AMR), power quality monitoring, communicating with switches and/or capacitor banks and/or sensors for temperatures and oil levels, power outage detection, and/or customer load management and/or other relevant functions. The present embodiments may also be used by service providers to offer voice and/or broadband Internet service to their clients using low voltage (LV) power lines and/or wireless access into the customer premises, as well as by, for example, utilities, city government authorities, or service providers to send data over the power lines (for example, MV lines) to and/or from security devices/video cameras, electronic signage and sensors mounted on and/or near utility poles or customer premises.

II. Power Line Communication (PLC) System

Returning to FIG. 1, a more detailed view of the structural and functional elements is provided below. The figure illustrates an exemplary system 100 in accordance with the present embodiments. It is important to note that the structural and functional elements provided in FIG. 1 and other figures presented below are provided for explanatory purposes only, and not to be considered limiting in any way or required for the embodiments presented herein.

System 100 provides for data transport over electrical power lines. System 100 includes a series of intermediate repeaters 102, 104, 106, a hub repeater 122, with a series of MV couplers 108, 110, 112, 114 connecting the repeaters 102-106, 122 to MV power lines 116, 118, 120.

In particular, system 100 illustrates repeaters 102-106, 122 and associated couplers 116-120 connected on a segment of an exemplary three-phase MV line (MV lines 116-118), as well as exemplary communications interfaces to exemplary external entities in communication therewith.

The repeaters may also be connected to one another through any type of alternative connections using any type of known technologies. For example, the repeaters may be connected via physical, fiber, Ethernet, optical or wireless interfaces. A few instances are shown. For example, repeaters 102, 104 may be connected over MV lines 116, 118, over fiber interface 162, or wireless interfaces 166, 168. Hub repeater 122 and any other repeater may be connected over an external IP network 158 (such as the Internet), over backhaul Ethernet or fiber connections 160, in a system managed by a network management system 156.

Repeaters 102-106, 122 may also be connected to any types of devices. As shown, repeaters 102, 104, 106 are connected to MV user devices 124, 126, 128, respectively, or to LV user devices 136, 138, user power supply devices 148, user data/voice devices 154 and the like. Any type of device may be connected directly or indirectly to the repeaters.

In exemplary embodiments, the repeaters near and/or nearest to a sub-station may be referred to as hub repeaters. For example, hub repeater 122 may be a repeater near and/or nearest the sub-station.

Exemplary hub repeater 122 may have the same and/or modified functions as repeaters 102-106. Exemplary hub repeater 122 and intermediate repeaters 102-106 may connect, for example, to LV gateway 130, over for example, an Ethernet and/or fiber (Ethernet/fiber) interface connection 164.

In the illustrated embodiment, LV gateway 130 provides connectivity to three LV power lines (phases) 142, 144 and 146, though any other number/combination of lines may be used. Lines 144, 146 respectively provide connections to exemplary meter interface units (MIUs) 132, 134, which in turn may connect to LV user devices 136, 138, across user device interface 140, for example.

Exemplary LV line 142 may provide a connection to user power supply device 148, having a user data port 150, as shown. As another example, exemplary LV line 142 may also provide a connection to one or more user data and/or voice devices 154 via user data/voice adapter 152.

In addition, for longer distance communications over the MV lines, the system may include one or more additional repeaters (not shown) to boost the signal level and allow any of the illustrated components of system 100 to communicate with each other at, for example, high bandwidths over longer distances.

As shown in FIG. 1, hub repeater 122 may be connected to one, two or multiple MV lines 116-120 and connection to each MV line 116-120 may be made using exemplary MV couplers 108-114. In exemplary embodiments, a line coupler, such as the illustrated MV couplers 116-120, may be uniquely produced. In alternative embodiments, the line coupler, such as the illustrated MV couplers 116-120, may be created by adapting a commercially available MV coupler in accordance with the present embodiments. Exemplary commercially available couplers are models provided, for example, by ARTECHE USA, of Pembroke Pines, Fla., and may be, for example, either capacitively or inductively coupled to MV lines 116-118 upon adaptation in accordance with the present embodiments. Such commercially available couplers may be adapted in accordance with the present embodiments as further described below.

Figure 9A:
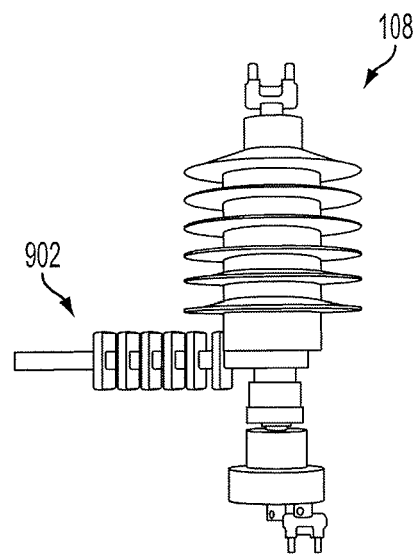
FIGS. 9A, 9B show exemplary couplers in accordance with the present embodiments.
Figure 9B:
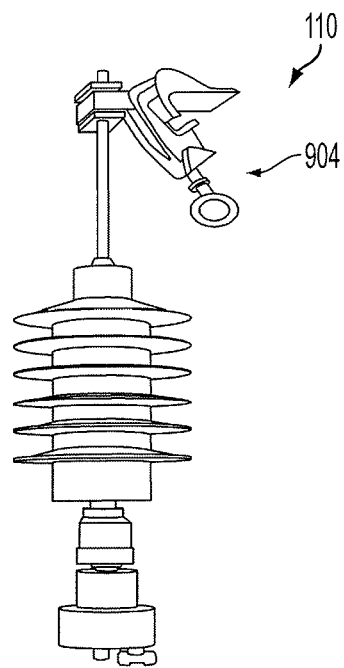

FIG. 9A illustrates an exemplary embodiment wherein exemplary coupler 108 is operable to be fixed on exemplary MV line (pole) 116 with a bracket 902. FIG. 9B illustrates another exemplary embodiment wherein another exemplary coupler 110 is operable to be fixed on exemplary MV line (pole) 116 with a bracket 904.

The repeaters provide PLC communications over single or multiple lines, such as MV lines or LV lines. For example, hub repeater 122, may communicate with an intermediate repeater 102 or another hub repeater (not shown) over a single or multiple MV lines 116-120. Similarly, an intermediate repeater 102, for example, may communicate with another intermediate repeater 104 or a hub repeater 122 over a single or multiple MV lines 116-120.

In exemplary embodiments, the repeaters detect and handle communications problems between them. For example, if a repeater 102 detects that communication on one MV line 116 is having problems, based for example on communication retries and/or a lack of confirmation for data sent after a timeout, repeater 102 may automatically switch over (or alternatively, be forced to switch over by a system operator (not shown)) to one or more other MV lines 118. Accordingly, in these exemplary embodiments, system 100 provides a unique redundancy capability.

In addition, in accordance with exemplary embodiments further described below, the communication between two or more repeaters may travel over a single MV line 116 or over multiple MV lines 116-120 concurrently and/or simultaneously, thereby providing a load-sharing mechanism and a higher aggregate bandwidth.

In exemplary embodiments, each repeater has one or more standard IEEE 802.3x Ethernet ports which may be configured to support various speeds, such as for example 10 Mbps, 100 Mbps and/or 1000 Mbps, to name a few. Each exemplary repeater may also have one or more fiber ports, or other types of port for other types of telecommunications technologies, for example. For example, hub repeater 122 is illustrated to have an Ethernet and/or fiber (Ethernet/fiber) interface connection 160 to an external network 158, such as an exemplary external Internet Protocol (IP) network.

In exemplary embodiments, each exemplary repeater may maintain a list of media access control (MAC) addresses of devices connected on its port, such as its Ethernet and/or fiber port, and the MAC addresses and/or other pertinent information are made available to the other repeaters in a logical network. As shown, external network 158 may provide a connection to such external items as central servers, network management systems (NMSs), voice over IP (VOIP) servers, and/or other devices, collectively labeled 158.

In an exemplary embodiment, multiple repeaters may be configured to create a "logical network" which may be defined by a network operator, such as network management server 156, for example. In an exemplary embodiment, one or more repeaters, such as a hub repeater 122 for example, may be designated as the central coordinator (CCo) whose functions may include managing the security and/or other operation of this logical network. In one or more embodiments, some or all repeaters, including the CCo itself, may communicate with the central network management system (NMS) 156 for their remote management and operations, using a standard network management protocol such as SNMP or other protocol.

In an exemplary embodiment, one or more standards and/or protocols may be used to define and set relevant procedures for the logical network including its relevant components. For example, the logical network, the bandwidth allocations, co-ordination of MAC addresses, and/or the designation of any repeater as a CCo, may follow procedures defined in a PLC (power line communication) standard or the like.

An exemplary such standard is one or more of the standards provided by HomePlug, such as, for example, the HomePlug 1.0, HomePlug command and control (C&C), and/or HomePlug AV standards. HomePlug refers to an industry group for PLC, which includes numerous corporations, and defines specification standards for PLC. For example, HomePlug 1.0 and HomePlug AV are respectively two specifications for networking technology for connecting devices through PLC.

The HomePlug AV standard, which may be used in exemplary embodiments, has been designed to enable high bandwidth applications, such as high definition television (HDTV) and/or VOIP, as examples. The standard provides maximal theoretical bandwidth over lines using adaptive modulation up to 1155 orthogonal frequency division multiplexing (OFDM) sub-carriers, with turbo convolution codes for error correction and two-level MAC framing. The standard also utilizes distribution techniques and the use of 128 bit advanced encryption standard (AES) type of encryption.

In exemplary embodiments, use of standard mechanisms, such as HomePlug AV, may be employed to create separate logical networks over MV power lines 116-118, which may be used to separate different services, such as for example, different uses for each one or multiplicity of service providers.

For example, a GSM service provider may use the MV lines for a backhaul connection between BTSs and/or base station controllers (BSCs), whereas another service provider may use a different logical network for WiFi hot spots, while a utility company may, for example, use the MV lines 116-118 for networking of electric meters and for smart grid applications. Each logical network may be secured and the bandwidth allocation for each application may be allocated by an NMS 156.

III. Repeater (102-106, 122)

Figure 2A:
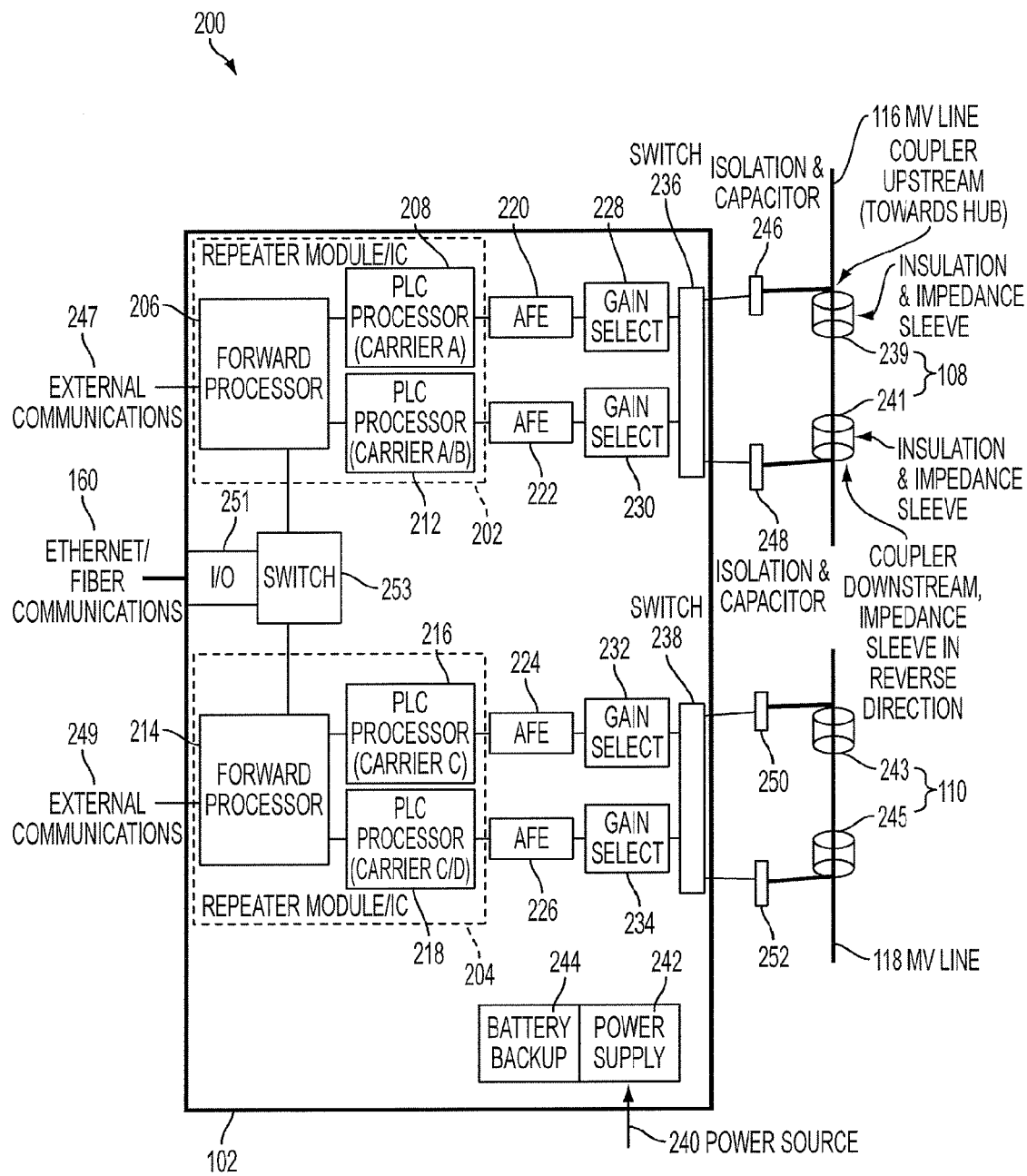
FIG. 2A shows a block diagram of an exemplary embodiment of a repeater according to the present embodiments.

FIG. 2A illustrates an exemplary functional block diagram of an exemplary repeater 102, though the functional block diagram may be representative of any of the foregoing repeaters 102-106, 122, and/or any other types of repeaters adapted to the present embodiments.

Repeater 102 includes a non-exclusive list of devices which may provide the functionality described below. In particular, repeater 102 includes repeater modules 202, 204, switch 253, input/output (I/O) 251, analog front ends (AFEs) 220, 222, 224, 226, gain selects 228, 230, 232, 234, switches 236, 238, battery backup 244 and power supply 242. As with the other above noted components, the battery backup 244 and power supply 242 are optional, as external power may be provided.

Repeater module 102 includes forward processor module 206, PLC processor module 208 and PLC processor module 202. Repeater module 204 includes forward processor 214, PLC processor module 216, and PLC processor module C/D 218.

In exemplary embodiments, PLC processor module 208 is a PLC processor module for carrier A, PLC processor module 202 is a PLC processor module for carriers A/B, PLC processor module 216 is a PLC processor module for carrier C, and PLC processor module 218 is a PLC processor module for carriers C/D. These non-exclusive functions will become apparent from the description below.

Repeater module 102 may include connections over non-PLC types of telecommunications devices, including data, voice, and/or other telecommunications connections, as shown on the left hand side of the device. For such communications, repeater module 202 may include, for example, Ethernet and/or fiber (Ethernet/fiber) interface 160, connected to switch 253 via I/O 251, to provide a connection to external IP network 158 (as also shown in FIG. 1). Any additional connections may be included as well, such as interfaces 247, 249 for other external communications. The external communications may be any one or more of the above described connections, such as any type of wireless connection for example.

In the illustrated exemplary embodiment, the right hand side of repeater module 102 provides PLC communications capability. In the embodiment shown, from switch 236, communications may be provided to/from MV line 116 (or any other MV line 118, 120), and/or to/from any one or more wires or "phases" comprising MV line 116. For example, communications may be provided to/from a hub repeater via upstream coupler 239, and to/from non-hub repeaters via downstream coupler 241. In exemplary embodiments, upstream coupler 239 and 241 together comprise coupler pair 108 as above described (see FIGS. 1, 9). An isolation and capacitor device 246 may also be provided for upstream communications, and an isolation and capacitor device 248 may be provided for downstream communications.

From switch 238, communications may be provided to/from MV line 118 (or another MV line 116, 120), and/or to/from any one or more lines, or "phases" comprising MV line 118. For example, communications may be provided with a hub repeater via upstream coupler 243, and with non-hub repeaters via downstream coupler 245 (together comprising coupler pair 110 as above described). An isolation and capacitor device 250 may be provided for upstream communications, and an isolation and capacitor device 252 may be provided for downstream communications.

Any type of external power source may be provided to repeater 102 as well. In the exemplary embodiment, power source 240 may comprise an alternating current (AC), direct current (DC), solar. The power may be supplied to power supply module 242, which may include battery backup 244. In lieu of power supply 242 and battery backup 244, the power source may be exclusively from the external source, such as from MV and/or LV line sources, as examples.

As illustrated and described, repeater 102 may be connected to one, two, or multiple MV lines 116, 118 and connection to each MV line may be made using one or more couplers, shown as coupler pairs 108, 110, as illustrated. Though connectivity via two MV lines 116, 118 are provided in the illustrated embodiment, any number of MV Lines and associated functions with regard to the present embodiments may be employed.

In exemplary embodiments, repeater 102 may also be mounted near one or more distribution transformers (DT) (not shown) or any other location and/or entities where the lines, for example MV lines 116, 118, may be present. DTs are pole-type transformers that supply relatively small amounts of power to residences, and may be used at the end of an electrical utility's delivery system. Both single-phase and three-phase are typically found.

In exemplary embodiments, there may be multiple hub repeaters depending on the number of MV lines originating from the sub-station. There may also be multiple such sub-stations in a city and/or other geographical area. In an exemplary embodiment, the sub-station may convert high voltages coming from a generating station via transmission lines into medium voltages, which may, for example, range from a couple of thousand volts to 33 KV or higher in exemplary embodiments.

In an exemplary embodiment, the MV lines may be present in a substantial number and/or all populated areas and/or within and/or in the vicinity of rural/remote areas and may be used to distribute electrical power to residential neighborhoods, commercial, industrial and/or other areas. The DTs may be located, for example, on a pole overhead, and/or above-ground and/or below-ground, as exemplary embodiments. For example, in certain embodiments, the DTs may be located near the home, facility and/or other customer premise.

The DTs may step down the medium voltages (MVs) to lower voltages (LVs), such as for example 110V and/or 220V, which may be delivered to the end consumers. In an exemplary embodiment, for certain customers the DTs may be located inside the customer premises, such as a large apartment building, hotel, or industrial and/or commercial building.

Hub repeaters 122 and/or intermediate (other) repeaters 102-106 may communicate with one another according to the embodiments set forth herein over MV lines 116, 118. In the illustrated embodiments, repeaters 102-106, 122 may include any type of interfaces for any types of connections, such as data connections. Ethernet/fiber 160 interfaces and external communications interfaces (for example, wireless communications) 247, 249 are illustrative examples.

Ethernet/fiber (backhaul) interface 160, for example, may provide a connection to an external network 158, such as the Internet, and may provide data connectivity to one or more servers, the NMS, and/or one or more other external public and/or private data communication networks, to name a few, collectively labeled 156 (FIG. 1).

In an exemplary embodiment shown in FIG. 2A, repeater 102 may contain switch 253, which may be a MAC switch for example. For example, switch 253 may be a standard Ethernet IEEE 802.3 MAC layer switch. In such an embodiment, for example, switch 253 of repeater 102 may switch the standard IP data packets between one or more I/O interface ports 251 and the MV Lines 116, 118, or between an MV Line 116 and another MV line 118. This may be based on the initial system configuration defined by a system operator and on dynamic changes occurring in the network.

Referring to FIG. 1, switch 253 in hub repeater 122 may switch the data between the fiber port 160 and the one or more MV lines 116-120. In intermediate repeater 102, switch 253 may switch the data between MV line 116 to the same MV line 116 or to another MV line 118, 120. In repeater 106, switch 253 switches data between MV line 116, for example, and its fiber port 164, which is connected to the LV Gateway 130.

The fiber port on a repeater can be also be configured to connect to another repeater via switch 253, for example, such as connection 162 (shown by dotted lines) connecting repeater 102 and repeater 104. This may be the case, for example, where fiber, such as fiber with ground wire, which is used by utilities along poles or transmission towers on their right of way, is already present. This may also be the case if a certain segment of the MV 116 line is underground, such as with the ingress to a building where the DTs are installed inside the building (found, for example, in large apartment buildings, hotels or large commercial or industrial buildings).

Repeater 102 may include one or multiple PLC processing functions which handle the low-level PLC over MV lines 116-120, using standard power line communication protocols such as HomePlug 1.0 and/or HomePlug AV.

PLC processors 208, 202, 216, 204 may deliver reliable data respectively to forward processors 206, 214. They may also receive data from forward processors 206, 214. In exemplary embodiments, the PLC processors 208, 202, 216, 204 may perform physical layer functions, including without limitation error detection and data recovery.

The forward processors 206, 214 may perform forwarding functions. The forwarding functions includes examining the standard physical level packet data unit (PDU) header and the PDUs regenerated are sent to the PLC processing function associated with the outgoing MV line. The PDUs which are terminating in the Repeater such as those going to the fiber optic power are converted to MAC layer frames and sent to the MAC switch 253. The PLC processing function and the forwarding function can be implemented as a discreet module or an integrated circuit (IC) chip.

Exemplary repeater 102 may send data over one wire (called one "phase") or two or three or more wires (called three or more "phases") of exemplary MV line 116 in a load-sharing manner, thereby aggregating the bandwidth obtained on the MV wires.

In certain embodiments, capacitive couplers 108, 110, which are used to inject data signals on to the MV wires 116-120 are comprised of a single unit (for example, 108, or 110) with a single point of attachment on the MV line. Here, a capacitor value may be chosen such that it blocks the medium voltages while passing through data signals for a given fixed frequency band. The repeater regenerates the signal in the same frequency band. Consequently, data is transmitted over all the phases of the MV line 116.

In certain other embodiments, however, the ability to send data over multiple wires of a single line is possible. In exemplary embodiments, if the PLC processors 208, 202, 216, 204 detect that the physical level on one MV line is having a problem (for example, due to too many errors or retransmissions), it will continue to send the data over the other MV wires, providing a robust system with built-in redundancy.

In these latter embodiments, upstream couplers 239, 243, and downstream couplers 241, 245 may be used (FIG. 2A). Accordingly, the functionality of coupler 108 may be divided between independent sections 239, 241, while the functionality of coupler 110 may be divided between independent sections 243, 245, each with a field-attachable capacitance. The capacitance value used in the upstream and downstream couplers may be set differently in these embodiments, allowing repeater 102 to operate in different frequency bands for the original and regenerated signal.

In addition, the upstream and downstream couplers 239, 241 may each contain isolation and capacitive sleeves 246, 248 which are installed over the MV line 116 and which acts as an impedance for the frequency band being used on the upstream link and do not allow these signals to pass through directly to the downstream coupler. Similarly, the upstream and downstream couplers 243, 245 may each contain sleeves 250, 252 which are installed over the MV line 118 and which acts as an impedance for the frequency band being used on the upstream link and does not allow these signals to pass through directly to the downstream coupler.

The sleeves may comprise a material such as ferrite and may be installed over the MV lines 116, 118 using an insulating material, such as silicone or ceramic or other insulating material commonly used on MV lines. This allows the same frequency band to be reused on the upstream and downstream portions of the MV line.

In the embodiment of FIG. 2A, repeater 102 may also operate using a single coupler by the setting of switches 236, 238. In fact, switches 236, 238 permit a user, such as the individual installing repeater 102 in the field, to select the use of either a single coupler or the dual upstream and downstream couplers described above.

In exemplary embodiments, multiple PLC processors 208, 202, 216, 214 may be set to operate in different frequency bands. In exemplary embodiments shown in FIG. 2A, PLC processor 208 operates in the carrier A frequency band, PLC processor 202 operates in the carrier AB frequency bands, PLC processor 216 operates in the carrier C frequency band, and PLC processor 218 operates in the carrier C/D frequency bands. The A, B, C and D frequency bands may be described as referring to carrier groups A, B, C and D, respectively.

In standard PLC protocols, such as HomePlug AV, the commonly used frequency band (2-30 MHz) may be subdivided into over 1000 carriers which are transmitted using orthogonal frequency division multiplexing (OFDM) techniques. Certain carriers frequencies in this range such as those used by amateur radio bands are not used and are notched out.

In exemplary embodiments, the frequencies can be subdivided into multiple carrier groups, such as exemplary carrier groups 2-15 MHz, 15-30 MHz, 30-45 MHz, 45-60 MHz, respectively, or may be alternatively divided to include higher frequencies, depending on their availability in a given region, country, or the like.

Each OFDM carrier and the respective carrier group can be set with an independent signal gain, depending on which frequencies are available in a given geographical area. The signals with higher gains may travel longer distances over MV lines 116-120, such as 2 Km or longer. This allows greater flexibility as certain frequencies, which may not be available in some areas (as they can cause interference) may be permissible in other geographical areas. Frequency groups lower than 2 MHz can also be used when the PLC processor utilizes, for example, the HomePlug C&C or other standard PLC protocols.

Also, certain countries and/or regions may permit or license certain predefined frequencies for PLC, especially in rural/remote areas. Higher gains may be used for certain carrier groups while other frequencies may be used at a lower gain, keeping them below the allowable emissions limits. This geographical flexibility is unlike other systems where the same set of frequencies are used in all geographical areas of the city/region.

In exemplary embodiments, exemplary repeater 102 may operate using a single coupler 108 (or 110) and utilize different carrier groups on either side. For example, these groups may be defined by the system operator and set to alternate between the multiple phases of the MV lines.

Figure 2B:
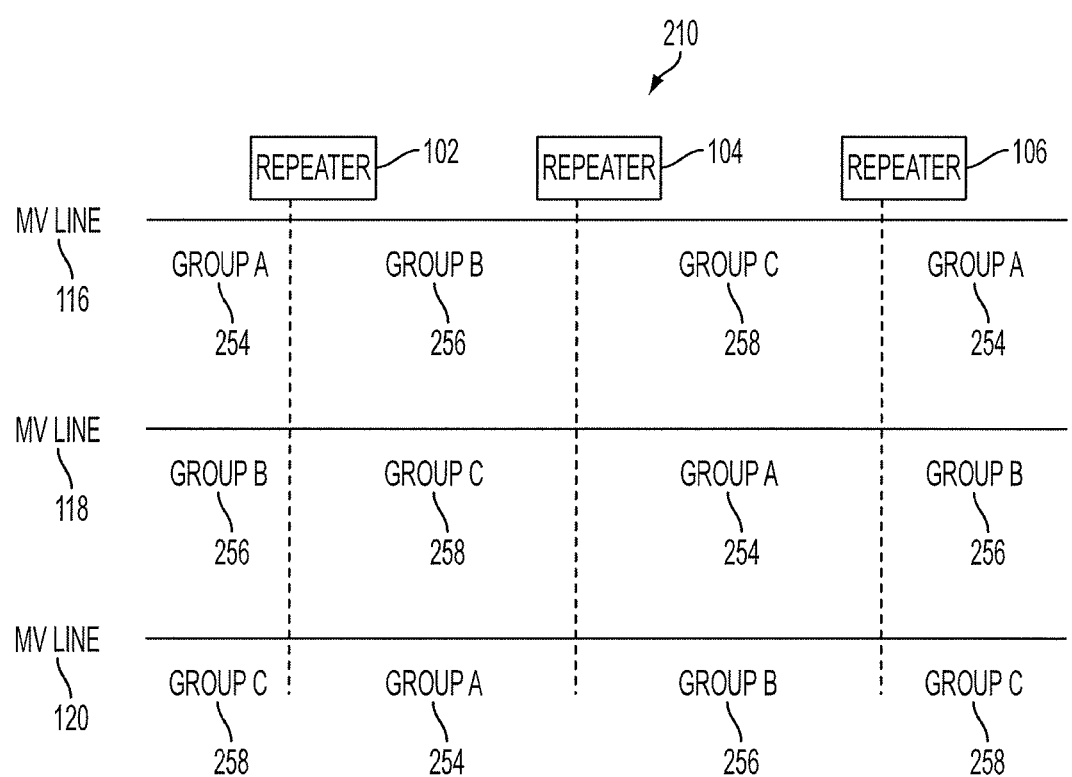
FIG. 2B shows an exemplary illustration of spatial frequency division multiplexing for three phase lines.

Alternately, in reference to FIG. 2B, exemplary repeater 102 may communicate with its neighboring repeater and on multiple MV lines to define a quasi-static frequency plan. For example, the system operator may define three carrier groups, A 254, B 256 and C 258, where for example A is defined as 2-28 MHz, B is defined as 30-48 MHz, and C is defined as 50-80 MHz. Repeaters 102, 104, 106 may be connected on the 3 MV lines 116, 118, 120 to communicate with each other. An alternating order may be set, such that two parallel segments of the MV lines 116, 118, 120 never have the same group. This technique which minimizes the interference between adjacent MV lines is illustrated in FIG. 2B.

Referring back to FIG. 2A, wireless connectivity may be provided as well. In exemplary embodiments, forward processors 206, 214 may provide wireless processing capability and external interfaces 247, 249 may include wireless interfaces and/or connections thereto. For example, repeater 102 may also include a backup communication function which utilizes these built-in wireless interfaces, to provide communications with 156 (FIG. 1), which may include NMS, other central servers and/or external data networks using wireless communications.

In exemplary embodiments, this wireless connectivity may be utilized when power line connectivity is lost between neighboring repeaters. The connectivity could be lost due to reasons such as a line breakage, fault due to a poor quality line or caused by weather/lightning, or a transformer overload or equipment failure, or a blown fuse, to name a few. Exemplary forward processor 206 of an intermediate repeater 102 may detect that connectivity on exemplary MV line 116 is lost, and may attempt to switch the data traffic to another exemplary MV line 118 if present. The functionality may also apply to detection of a lost connection over one or more phases within a line, instead of the line itself.

The backhaul network may be used as well, particularly if re-routing through an electric power line is not available. For example, if exemplary forward processor 206 is unable to communicate on any MV line, it may immediately send an alarm to NMS 156 using the above noted backup wireless channel. The backup wireless channel may be implemented using a commercially available wireless service such as the mobile/cellular/GSM short message service (SMS) or text messaging service, a private or public WiMax or other wireless link, as examples.

In case the GSM service is used, the forwarding processor 206 may communicate the NMS data via an RS232 interface to a commercially available GSM Modem, such as a model offered by Wavecom, S.A. The Wireless interface may also be used to communicate other information to NMS 156 and to other central servers or external data networks, such as metering data or power quality monitoring data as configured by the system operator.

In exemplary embodiments, interfaces 247, 249 may be standard physical user device interfaces, such as RS232, RS485, and Ethernet as well, providing each repeater 102-106, 122 the ability to connect to MV user devices 124, 126, 128. These user device may include external utility devices, like meters, power quality monitoring devices, or switches. The ability is provided to communicate reliably using either MV power lines or backup wireless links seamlessly between a remote NMS and such external utility devices. The MV user device interface allows external devices, such as a meter or power quality monitoring devices near the repeater location, to be read from NMS 156, or an external switch can be enabled/disabled remotely from the NMS to control external devices like capacitor banks.

FIG. 1 also shows an LV gateway 130, whose function may include stepping down the voltage to 110 and/or 220 volts, for example, may be connected to repeater 106 over an Ethernet/fiber interface 164. In exemplary embodiments, LV gateways 130 may be connected to any repeater in the system. LV gateway 130 may be an external device which is commercially available from manufacturers, such as Asoka Inc., which physically connects, for example, to 3-phase low voltage (LV) wires on the customer side of the DT.

LV gateway 130 may provide the connectivity for communications from MV lines to LV lines, towards the customer premises and the electric meters. LV Gateway 130 may use standard IP protocols on its interfaces and utilizes PLC standards, such as HomePlug 1.0 on the LV lines, for example. LV Gateway 130 may also provide a secure connectivity to the MIUs and other devices, as may be configured by the system operator. FIG. 1 illustrates MIUs 132, 134 respectively connected to LV lines 146, 144. Over the user device interface 140, MIUs 132, 134 are respectively connected to LV user devices 136, 138.

IV. Meter Interface Unit (132, 134)

MIU 132 may be an external standalone unit or it can be retrofit and mounted inside the meter casing, or its functionality can be embedded inside an electric meter, for example. Any of these combinations may be used in accordance with the present embodiments.

Figure 3A:
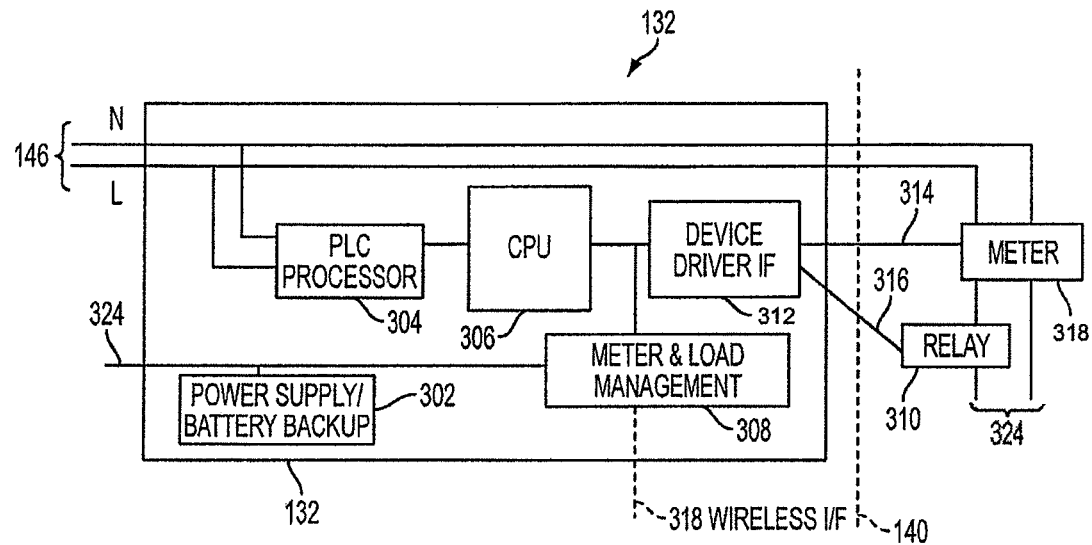
FIGS. 3A, 3B, 3C and 3D show respective block diagrams of exemplary meter interface units (MIUs) with and without built-in metering and/or sensing functions according to the present embodiments.

FIG. 3A shows a functional block diagram of exemplary MIU 132. In these embodiments, the device is an external unit and/or the metering function may be provided externally. In an exemplary embodiment, MIU 132 may be a system component which is mounted near an electric meter at the customer premise.

The functions of the MIU 132 (and/or 134) may include the following: capturing meter data for power loss scenarios, determining when and how much power was used (such as time of day, day of week, week of month, month of year), remote capabilities, such as power disconnects, remotely controllable functions, optional internal power backups, such as last gasp notifications, power loss/restoration, sending alerts/notification in the event of power loss, optional external interfaces to backup power sources, notifications, alerts, and alarms, such as notification control messages, and two-way control of high energy devices, such as air conditioners (ACs), to, for example, obviate the need for rolling blackouts.

MIU 132 may include power supply/battery backup 302, PCL processor 304, central processing unit (CPU) device 306, meter and load management processor 308, and device driver/interface 312. CPU device 306, as well as any of the other devices, may include programming, data storage and/or memory storage and functionality, as set forth in accordance with the FIG. 8 embodiments. Device driver/interface 312 may be used for connecting to any type of interface, such as an RS232 interface. In exemplary embodiments, the power supply/battery backup 302 is an optional unit, as the power may be derived from the source at 146.

As shown in FIG. 1, MIU may connect to any type of LV user devices 136 (or other types of devices connected by other types of lines, based on the application desired) over user digital device (for example, physical type) interface 140. As shown in FIG. 3A, meter 312 and relay device 310 are examples of LV user devices. Meter 312 is connected over connection 314 to the device driver/interface 312, and relay 310 is connected over connection 316 to the device driver/interface 312. Accordingly, the device driver/interface 312 permits connection to any type of external device over its digital physical and/or other interface 140.

User devices 136 (for example, meter 318, relay 310) may be connected to the customer premises through LV wires/lines. As shown, the devices are provided a customer premises interface 324.

A wireless interface 318 may be provided as well. In exemplary embodiments, the wireless interface includes any type of alternative interface mentioned herein, and in the illustrated embodiment, the wireless interface provides connectivity for meter and load management 308.

In exemplary embodiments, the power supply/battery backup 132 and/or meter and load management 308 may be connected to the customer premises via LV wires/lines at customer premises interface 324. This may be for such exemplary functions as receiving local power supply, and/or meter and/or load management instructions from local devices at the customer premises.

Inbound and outbound communications is also received and transmitted to the MIU 132 to and from the transformer over LV lines 146. Line 146 is shown to include line (L) and neutral (N) lines.

In exemplary embodiments, MIU 132 may interface to a single meter 312 or to multiple meters (not shown) such as in multi-tenant residential or commercial buildings, using a variety of standard physical interfaces such as RS232, RS485, optical, wireless and Ethernet over link 314. In exemplary embodiments, an RS232 interface may provide the physical interface to a single meter, while RS484 and Ethernet interfaces may provide the physical interface to multiple meters.

In exemplary embodiments, device driver/interface 310 and/or digital physical interface 140 may include standard optical interfaces used by meters, such as ANSI C12-18. In exemplary embodiments, meter 314 has an internal RS-232 physical interface for communication with device driver/interface 312. In exemplary embodiments, the internal RS-232 interface uses lower voltages than typical RS232 links to indicate the 0's and 1's to transmit/receive light emitting diodes (TX/RX LEDs). In exemplary embodiments, for optical interfaces, the physical connection consists of a TX/RX pair of wires which are physically attached to the corresponding LEDs inside the meter, and may be soldered to the base of the LEDs or a special pin-adapters may be provided which are inserted at the LED base. In exemplary embodiments, an RS232 driver inside the MIU 132 converts these lower level signals to the standard RS232 levels. In exemplary embodiments, when an Ethernet interface is used, the RS232 interface on multiple meters may be combined using an externally available RS232-Ethernet converter, such as a model offered by Lantronix®, Inc.

In exemplary embodiments, where the meters 312 are distributed in the customer premises, the MIU may communicate with the meters over the LV power lines 324 in the customer premises, using a standard PLC interface such as HomePlug 1.0. In exemplary embodiments, the MIU 132 may be located at a common location such as the distribution panel. The MIU 132 may also communicate with meters 312 dispersed over the customer premises using a standard Wireless interface, such as IEEE 802.15.4/Zigbee.

As shown in FIG. 3A, the MIU includes a CPU 306 which processes the data received from or sent to the meter 312. In exemplary embodiments, the messages and data formats exchanged between the CPU 306 and the meters 312 may be defined in standards, such as ANSI C12-18, and utilize an asynchronous octet-based half-duplex transmission. However, the present embodiments may be used with any standards and transmission types, particularly since not all meter manufacturers follow these standards, and as there may variations in the messages and data formats.

In exemplary embodiments, a system operator may define the interface parameters appropriate for a specific meter, such as the baud rate, the number of start/stop bits, the parity, and any other parameters. The operator may also define the number of octets to receive from the meter or a time to wait for after which the MIU 132 may packetize the data into an IP packets and send it via interface 146 (from PLC processor 304) to the LV gateway 130, and eventually to the central servers 156 which may process the meter data.

The communication between the MIU 132 and the central servers 156 may use standard protocols, such as ANSI C12.18 or C12.22, such that the central servers 156 may be unaware of the variations in the meter vendor's implementation of the standard.

Similarly when messages are received by MIU 132 from the central servers 156 which manage the meters, they may arrive over the PLC interface 146 as IP packets and the MIU 132 may convert them to appropriate asynchronous octets based on the interface parameters configured by the system operator, and transmit them to the meter. Accordingly, in addition to numerous other unique features, the present embodiments provide the ability for the MIU 132 to communicate with any meter using a variety of interfaces, such as physical interfaces, and perform the protocol conversions.

The MIU 132 may also communicate with other devices 136 at the customer premises, such as ACs/compressors, fans, switches, and/or thermostats, which may be equipped with a standard communications interfaces and protocols such as HomePlug Command and Control, and/or Zigbee protocols, as examples.

As shown in FIG. 3A, in exemplary embodiments the meter and load management function 308 may provide the interface to devices 136. It may allow the MIU to send standard commands to perform load management. In differing embodiments, the commands may be initiated by a central server 156 and/or automatically by the MIU 132 based, for example, on a system operator defined criteria. The criteria may be, for example, a threshold being reached in the meter reading. The threshold may be used to control and/or turn on/off individual loads at the customer premises. An example would be changing the thermostat setting based on the peak energy consumption indicated by the meter 312 and/or based on a command from the central server 156. The commands from the central server 156 may be sent, for example, as IP packets which are delivered via the hub repeater 122, any intermediate Repeaters 102-106, and/or the LV gateway 130 to the MIU 132 at the customer premises.

In exemplary embodiments, a system operator defined subset of commands may also be sent over the wireless interface on the repeater (such as the cellular/mobile text message interface) allowing consumers to control their home devices, such as for the parameter of the thermostat setting. In exemplary embodiments, the commands may be rendered remotely via, for example, a cell phone and/or commands rendered via an Internet browser (for example, mobile and/or landline), where the capability (service) may be allowed by the utility services provider.

In exemplary embodiments, the sub-system in FIG. 1 comprising a single LV gateway 130 and multiple MIUs 132, 134 may reach several thousand devices such as meters, thermostats, switches, and/or consumer broadband devices. A single LV gateway, such as models commercially available from Asoka, Inc., may support up to 100 MIUs 132. In exemplary embodiments, each MIU 132 in turn may support up to 100 user devices 136, thereby allowing up to 10,000 devices to be supported per DT in such embodiments. In exemplary embodiments, for a city with 1000 or more DTs, the System is capable of providing reliable two-way communications to 10 million or more devices.

Figure 3B:
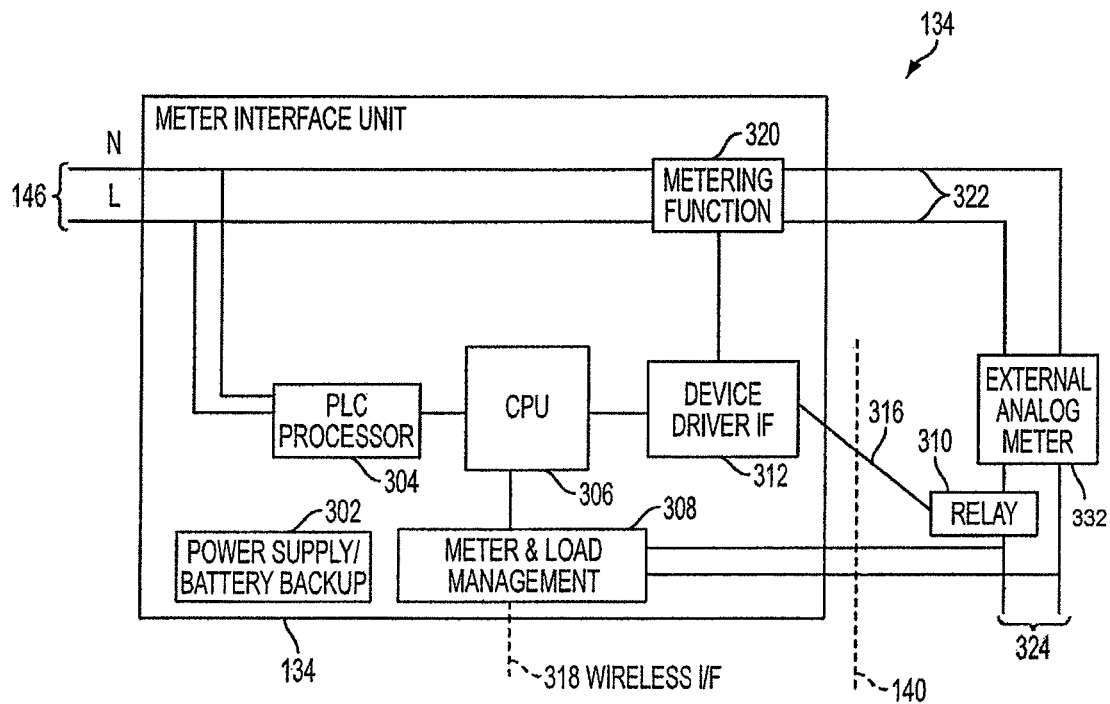
Figure 3C:
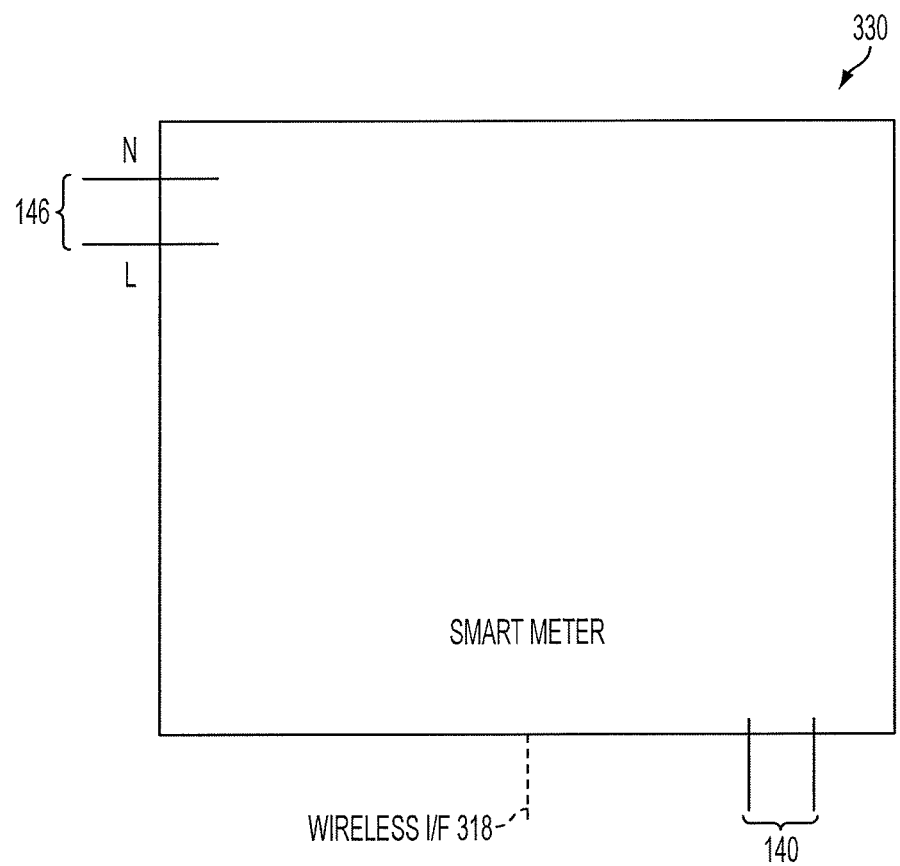
Figure 3D:
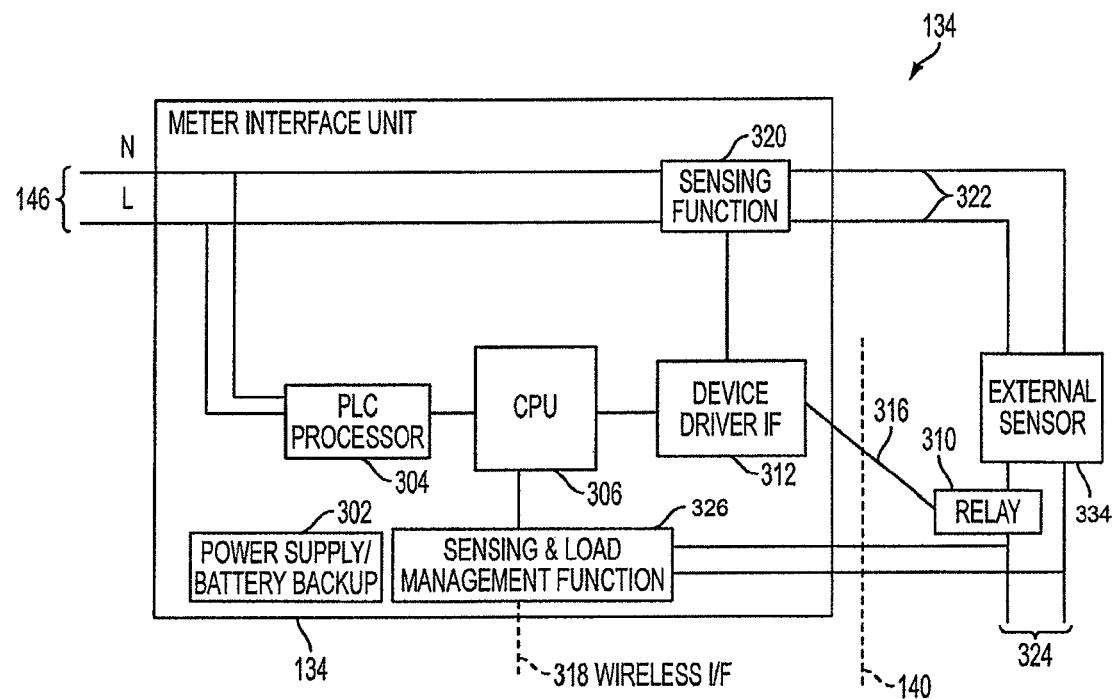

FIGS. 3B, 3D illustrate embodiments of other exemplary embodiments of MIU 134. In these embodiments, one or more metering functions may be included inside the MIU. In these embodiments, the MIU 134 may be mounted near an analog electric meter at the customer premise or, for example, at any intermediate point on the LV line where one or more energy-related parameters such as voltage, current, power factor, energy usage and voltage fluctuations, are to be monitored.

MIU 134 may include metering function and/or sensing function device 320, power supply/battery backup 302, PCL processor 304, CPU device 306, meter and load management function processor and/or sensing and load management function processor 326, and device driver/interface 312. CPU device 306, as well as any of the other devices, may include programming, data storage and/or memory storage and functionality, as set forth in accordance with the FIG. 8 embodiments. Device driver/interface 312 may be used for connecting to any type of interface, such as an RS232 interface. In exemplary embodiments, the power supply/battery backup 302 is an optional unit, as the power may be derived from the source at 146.

In exemplary embodiments, MIU 134 may include any or all of the foregoing functions of MIU 132.

In the exemplary embodiments shown in FIGS. 3B, 3D, the MIU 134 may be connected to an older analog electric meter 332 by non-digital link 322, which is not a digital communications interface, such as an RS232 interface, and or to any external sensor 334. In an exemplary embodiment, a digital communications interface 140 exists between device driver/interface 312 and relay 310, for which connection 316 is provided.

For an exemplary embodiment, FIGS. 3B, 3D show the functionality for a single-phase meter connection. The line (L) and neutral (N) wires 146 from the transformer which may normally connect to the analog electric meter, may be routed though the MIU 134 as shown in the FIG. 3B. The L and N lines may be input to the metering function, which may comprises a module, such as one commercially available from vendors such as Texas Instruments, which may make real-time measurements of voltage, current and phase using commercially available current transformer (CT) or shunt sensors, or may be adapted in accordance with the present embodiments to perform one or more additional functions stated herein. (Refer to the embodiments described for MIU 132.) The measurement data may be sampled and analyzed and converted into data which may be sent over the internal RS232 interface to CPU 306. The CPU 306 may handle the meter data and transmit it to the central server 156 using the PLC towards the transformer side.

In these embodiments, the MIU 134 may also perform a meter, load and/or or sensing management function 308 where it communicates with devices such as a thermostat or and/or AC/fans or switches or battery storage device used in conjunction with alternative energy sources such as solar or wind, inside the customer premise using either a PLC standard such as HomePlug or a wireless interface such as Zigbee, for example.

FIG. 3C includes an exemplary embodiment of the MIU, namely MIU 330, wherein MIU 330 is a smart meter and includes some or all of the functions of the above noted embodiments within a single device (shown), or alternatively one or more connected devices communicating together.

Figure 15:
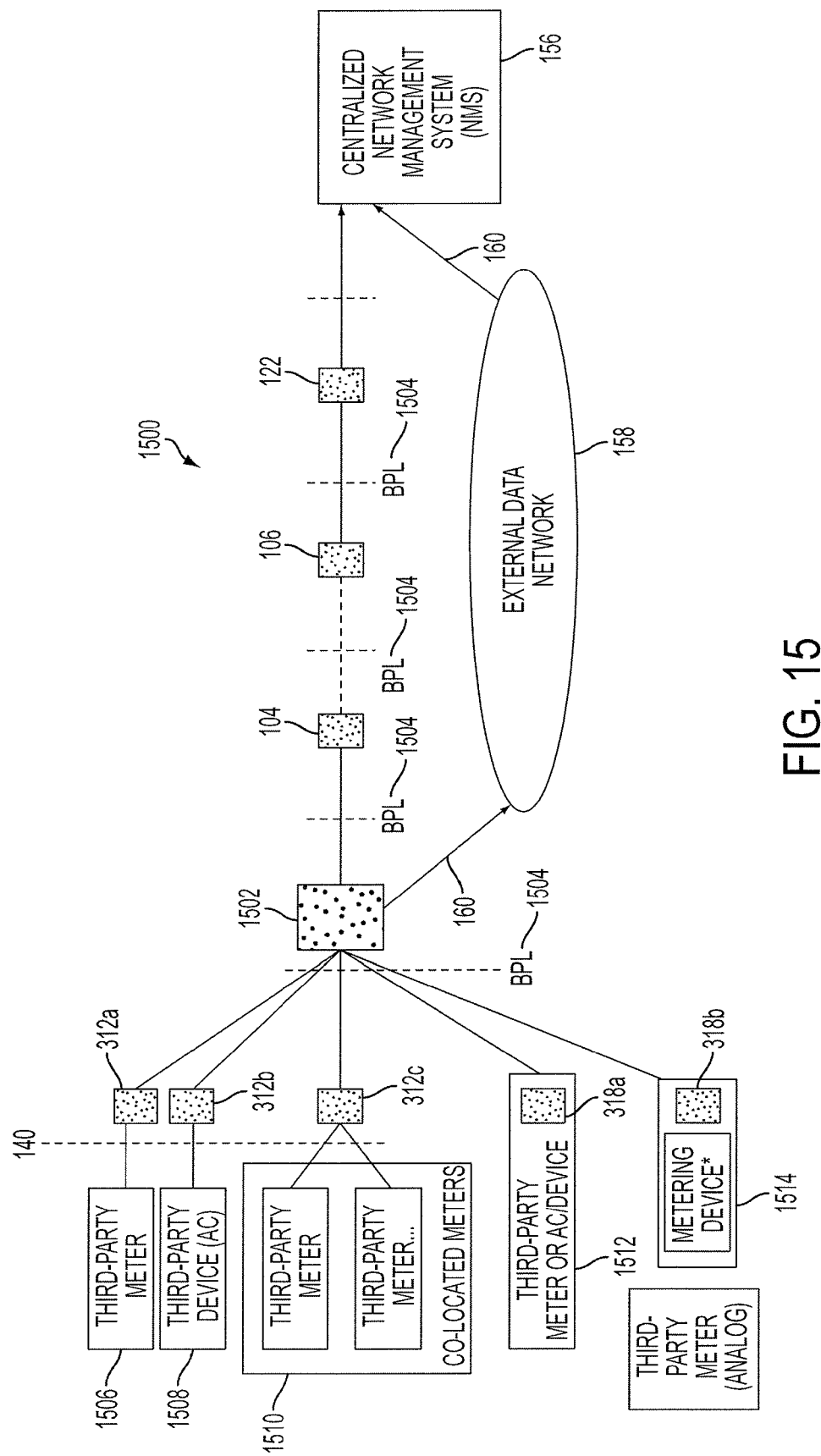
FIG. 15 provides an advanced implementation system in accordance with the present embodiments.

FIG. 15 provides an advanced implementation system 1500. In exemplary embodiments, system 1500 includes a variety of meter types and other devices connected to a meter gateway 1502 over exemplary digital communications interface 140. As shown, third party meter 1506 (for example, meters from multiple vendors), third party device 1508 (such as an AC) and co-located third party meters 1510, are respectively connected via external MIUs 312a, 312b, 312c to meter gateway 1502. In addition, legacy devices, such as third party meter and/or AC device 1512 including internal meter interface unit functionality 318a, and third party analog meter 1514 with metering device and internal meter interface functionality 318b, may communicate with meter gateway 1502.

In exemplary embodiments, MIUs and/or related functions 312a, 312b, 312c, 318a, 318b communicate over high speed Broadband over power lines (BPL) interface 1504 to meter gateway 1502. In exemplary embodiments, meter gateway 1502 may provide links over additional BPLs 1504 to intermediate repeaters 104 and 106 to hub repeater 122, which in turn may provide a backhaul link 160 to central network management system (NMS) 156. In other or related exemplary embodiments, meter gateway 1502 may provide a backhaul link 160 to external data network 158, which may in turn provide another backhaul link 160 to to central network management system (NMS) 156.

In exemplary embodiments, system 1500 may provide support for multiple-vendor (third party) meters, large capacaties (for example, over 10,000 meters/devices per DT, carrier-grade reliability, AC/load device controls, wireless (GSM) and/or phoneline (DSL) backup/backhaul connections.

V. User Power Supply Unit (148)

Figure 4:
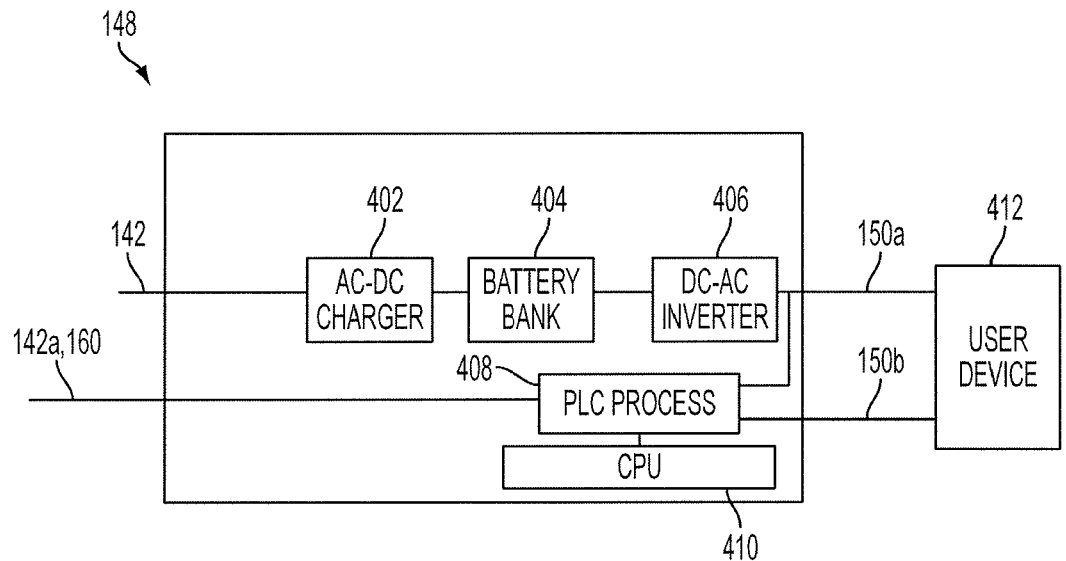
FIG. 4 shows a block diagram of an exemplary user power supply unit according to the present embodiments.

FIG. 4 shows a functional block diagram of exemplary user power supply unit (PSU) 148. In the exemplary illustrated embodiment, the PSU 148 may include AC-DC charger/converter 402, batter bank 404, DC-AC inverter 406, PLC processor 408, and/or CPU 410. DC-AC inverter 406 and PLC processor 408 may communicate with external user devices 412 via AC power interfaces 150a, and PLC processor 408 may communicate with external user devices 412 via separate ports 150b.

In exemplary embodiments, the PSU 148 is a system component installed at a customer premise. In exemplary embodiments, the PSU 148 may be an external standalone unit, such as a power supply inverter, voltage stabilizer and/or backup power source, or the functionality may be embedded inside such existing devices. The following description applies to its embodiment as an external unit, as shown in FIG. 4, which is not to be construed as limiting or exclusive in any way.

In exemplary embodiments, the PSU 148 provides backup power to exemplary user devices 412. Exemplary user devices 412 may be any of the foregoing described user devices. In related exemplary embodiments, exemplary user devices 412 may be any other devices, such as electronic equipment and/or BTSs at a mobile and/or cell phone tower.

As shown in FIG. 4, PSU 148 may receive the AC power supply from the DT at exemplary LV line 142, and the AC-DC charger 402 may convert this to a DC power source to charge a bank of batteries 404 at the customer premise. The DC voltage from the battery bank 404 may be inverted back to an AC supply by DC-AC inverter 406, which may then be used by the user devices 412, at the customer premises.

As shown in FIG. 1, in exemplary embodiments PSU 148 may communicate with the LV gateway 130 over the low voltage (LV) wires 142. In exemplary embodiments, the PSU 148 also provides a data interface, such as a standard Ethernet/IP port 160, which may be connected to user devices, such as the backhaul data port of a BTS/BSC located at the cell phone tower. The user data may be received by the PLC processor 408 under the direction of CPU 410, which may inject the data on the LV wires 142a going toward the LV gateway 130, bypassing the DC wiring and other electronics inside the PSU 148. This may provide a two-way broadband communication link for the user IP data via the LV gateway, any repeaters 102-106 and the hub repeater 122, to the external data networks 158.

In exemplary embodiments, the PSU 148 may be equipped to provide standard IEEE 802.3x Ethernet 10/100/1000 Mbps interfaces and/or standard T1/E1 interfaces. In situations where the distribution transformer (DT) is located at the customer premise, such as a cell tower, the data port on the user device 412 may be directly interfaced to the LV gateway 130 or to the repeater 102-106, 122.

VI. Broadband Embodiment

Figure 5:
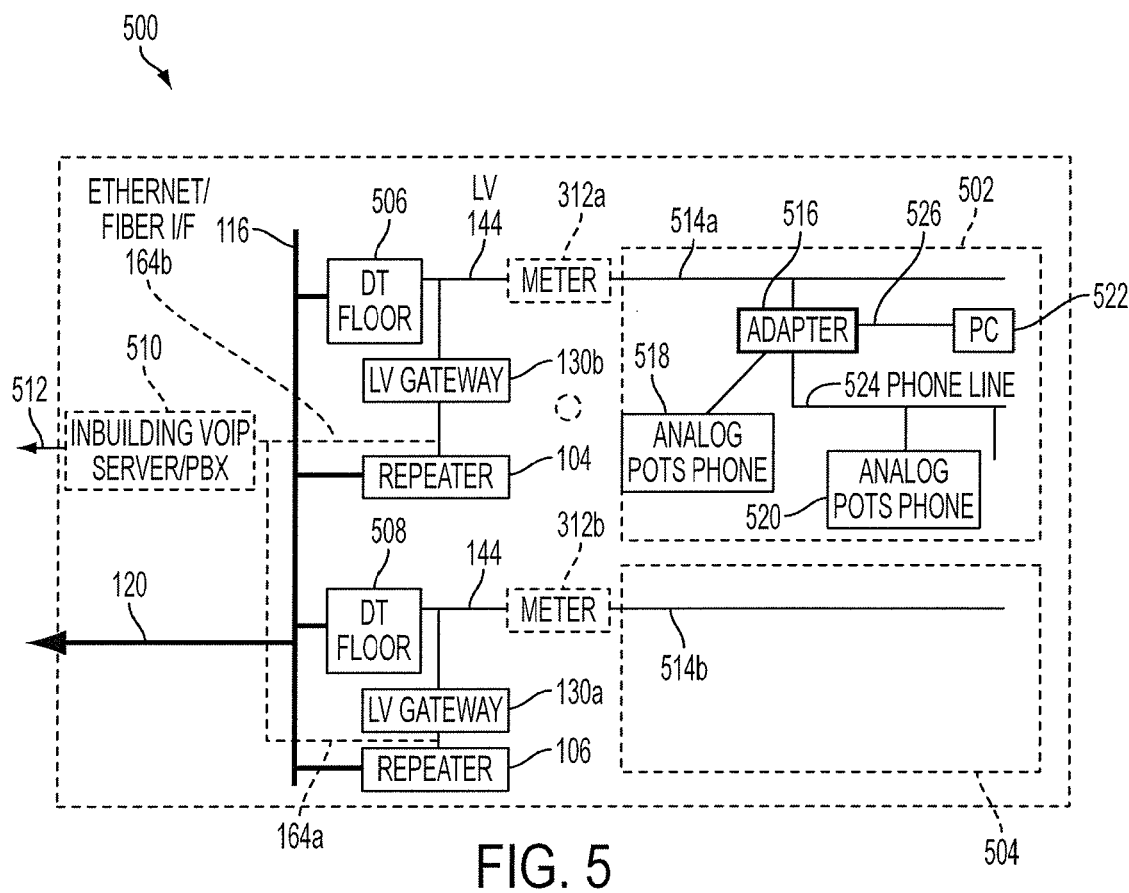
FIG. 5 shows a block diagram of an exemplary embodiment of voice and data communications in a multi-dwelling unit (MDU) according to the present embodiments.

FIG. 5 illustrates an exemplary broadband environment 500. The exemplary embodiment shows how broadband Internet and voice communications using power lines in an apartment building or other multi-dwelling or multi-tenant unit (MDU/MTU) may be provided.

Environment 500 includes two individual apartment units 502, 504 within an MDU/MTU. Apartment unit 502 receives communications over power line 514a, and apartment unit 504 receives communications over power line 514b. The apartments may be on different floors, such that a first DT 506 serves a first floor, and a second DT 508 serves a second floor. DT 506 connects to meter 312a serving apartment 502 over exemplary LV lines 144, and DT 508 connects to meter 312b serving apartment 504 over other exemplary LV lines 144. The first floor includes LV gateway 130b connected via exemplary Ethernet and/or fiber interface 164b to repeater 104, and the second floor includes LV gateway 130a connected via exemplary Ethernet and/or fiber interface 164a to repeater 106. DTs 506, 508, and repeaters 104, 106 are connected over MV lines 116 to other devices above described or otherwise available, such as other repeaters, sub-stations, remote VOIP gateway servers, PSTN gateways to other dwelling units, and the like.

In this embodiment, exemplary adapter 516 plugs into an AC power outlet inside the apartment unit 502. Adapter 516 may include one or multiple Ethernet ports for Ethernet communications 526 to devices such as PC 522 and/or one or more analog ports for analog communications 524 to analog plain old telephone service (POTS) connections, such as POTS phones 518, 520. A standard POTS phone may be connected to the analog port, or alternately the analog port may be plugged into the existing phone jack on the wall using standard phone wires, to connect to one or more POTS phones in other rooms of the apartment. The Ethernet port on the adapter may be connected to the standard PC 522 shown, or for example, to a standard 802.11b or 802.11g wireless access point (WAP).

Adapter 516 may communicate with the analog POTS phones 518, 520 using standard signaling such as analog dial tones and/or DTMF tones. The adapter 516 may communicate with the LV gateway 130b using standard power line communications such as defined in the HomePlug AV standard. In an exemplary embodiment, the LV gateway 130b may communicate with a remote VOIP Server, for example, which is a standard IP telephony product available from companies such as Avaya, which provides the connectivity to the public switched telephone network (PSTN). The LV gateway may communicate with the VOIP Server via one or multiple repeaters on the MV lines 116 or by using its Ethernet and/or fiber interface 164b using other communication links such as wireless or satellite links or T1/E1 or fiber access as available in the MDU building. The VOIP Server may also be located at the sub-station or other any location and depending on the size of the MDU building, it may be also be located in the building.

Figure 6:
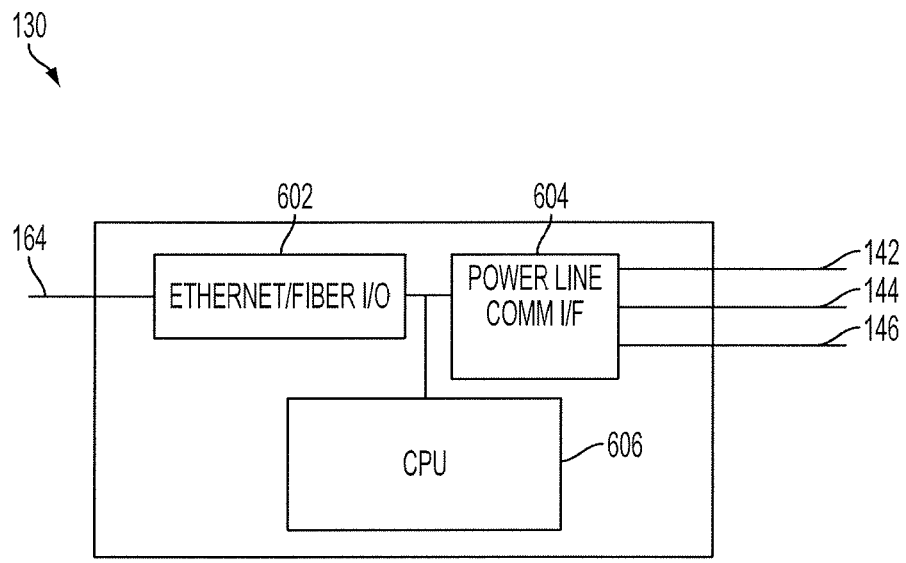
FIG. 6 shows a block diagram of an exemplary low voltage (LV) gateway according to the present embodiments.

Adapter 516 may communicate with the LV gateway 130b using standard IP protocols over the building's LV power lines 144. It may communicate with the VOIP Server using standard protocols such as SIP/UDP/TCP/IP for the signaling messages and RTP/IP for the voice data. FIG. 6 below shows a functional block diagram of an exemplary LV gateway 130 as may be used in this embodiment.

VIII. LV Gateway and Adapter

FIG. 6 provides a functional block diagram of an exemplary embodiment of LV gateway 130. LV gateway 130 may include an Ethernet and/or fiber driver/port 602 for Ethernet and/or fiber interface 164 communications with other repeaters and or other devices. LV gateway 130 may also include a power line communications adapter and/or interface 604 for exemplary separate LV power lines 142-146, as shown, or alternatively different wires (phases) of one or more power lines (now shown). A CPU 606 handles processing by the LV gateway 130, including for local management, TCP/IP, DHCP and the like.

Each LV gateway 130 may be configured with a unique static IP address that is known to the Network Management System (NMS). This IP address may allows IP packets from the NMS and the VOIP Server to be routed to the LV Gateway. The LV Gateway may receive its configuration information from the NMS, which includes a list of adapters which are authorized to communicate with it and their unique media access (MAC) addresses. MAC addresses may be used in PLC standards such as HomePlug AV to identify the physical address of the devices attached on the power line. When any such device powers up, it may follow standard procedures specified in the standards, such as HomePlug, to discover the MAC addresses of other devices on the power line to which it can communicate with.

The adapters 516 and LV gateway 130 may also be configured with a unique encryption key as defined in the standards such as HomePlug AV, which creates a unique and secure sub-network of the LV gateway 130 and its associated adapters. The adapter may send a DHCP request to the LV gateway 130 which may assign it a local (dynamic) IP address.

Figure 7:
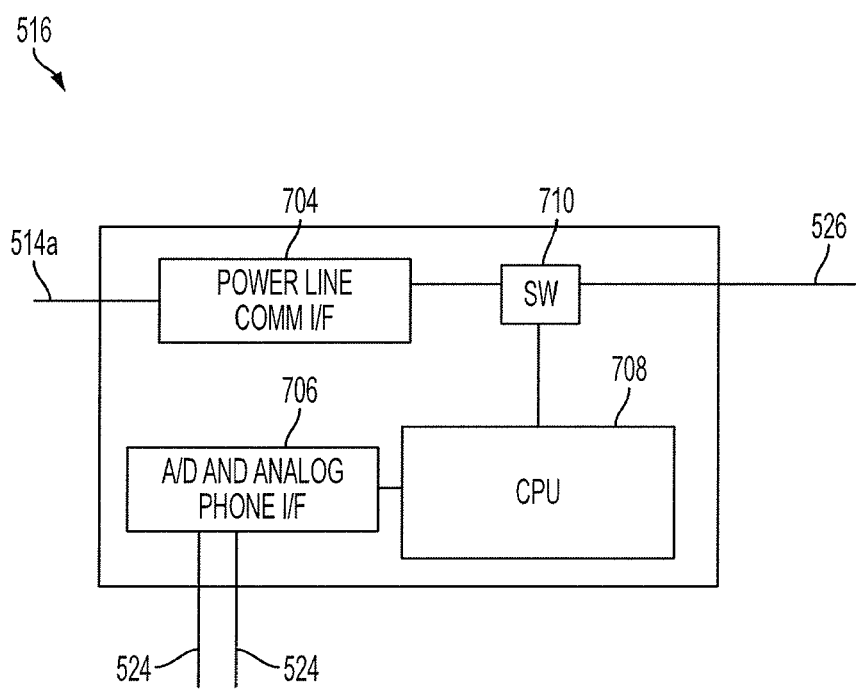
FIG. 7 shows a block diagram of an exemplary adapter according to the present embodiments.

FIG. 7 provides an exemplary functional block diagram of an exemplary 516 adapter as may be used in the present embodiment.

As shown, adapter 516 includes a PLC communications and/or interface device 704 for handling power line communications 514a to LV gateway 130, for example. It also includes analog-to-digital (A/D) and/or analog interface device 706 for analog communications 524 to analog POTS devices 518, 520 (now shown), for example. It also includes CPU 708 for its processing capability, which may include the ability to handle local management, TCP/IP, DHCP, SIP/VOIP, Hayes AT processing, as examples. Switch 710 handles switching capability for CPU 708, and provides connections to Ethernet and/or fiber device port 526, for example.

Adapter 516 may be assigned a phone number at the NMS and this information may be downloaded to the LV gateway 130 and adapter 516 in their configuration data. This phone number may be configured at the VOIP Server to be associated with the IP address of its LV Gateway. When an incoming call comes from the PSTN, the VOIP Server may determine the IP address of LV gateway associated with the called phone number and sends a standard SIP signaling message to the LV gateway, which receives the SIP message and utilizes the called phone number to map to appropriate adapter's MAC address and routes the message to the adapter using the LV power line in the building.

The CPU (SIP client) 708 in the adapter 516 processes the incoming call message and generates the ringing signals on its analog POTS port. When the user picks up the phone, adapter 516 may receive the off-hook signal from its phone interface function, and send the associated SIP protocol message to the VOIP server to complete the connection. Once the connectivity is established, the voice data may be sent between adapter 516 and the remote VOIP server as IP packets using the standard SIP/RTP protocol.

The analog POTS interface 706 in adapter may also be used to connect to external monitoring devices such as smoke alarms or audio devices which may be present in the MDU/building. The communication with such external devices uses standard protocols such as Hayes AT which are performed by the CPU 708 and the data may be encapsulated into standard TCP/IP protocol for transport over the power line and the communication network to the external management system used by such devices.

IX. Exemplary Basic Communications Process

Figure 10:
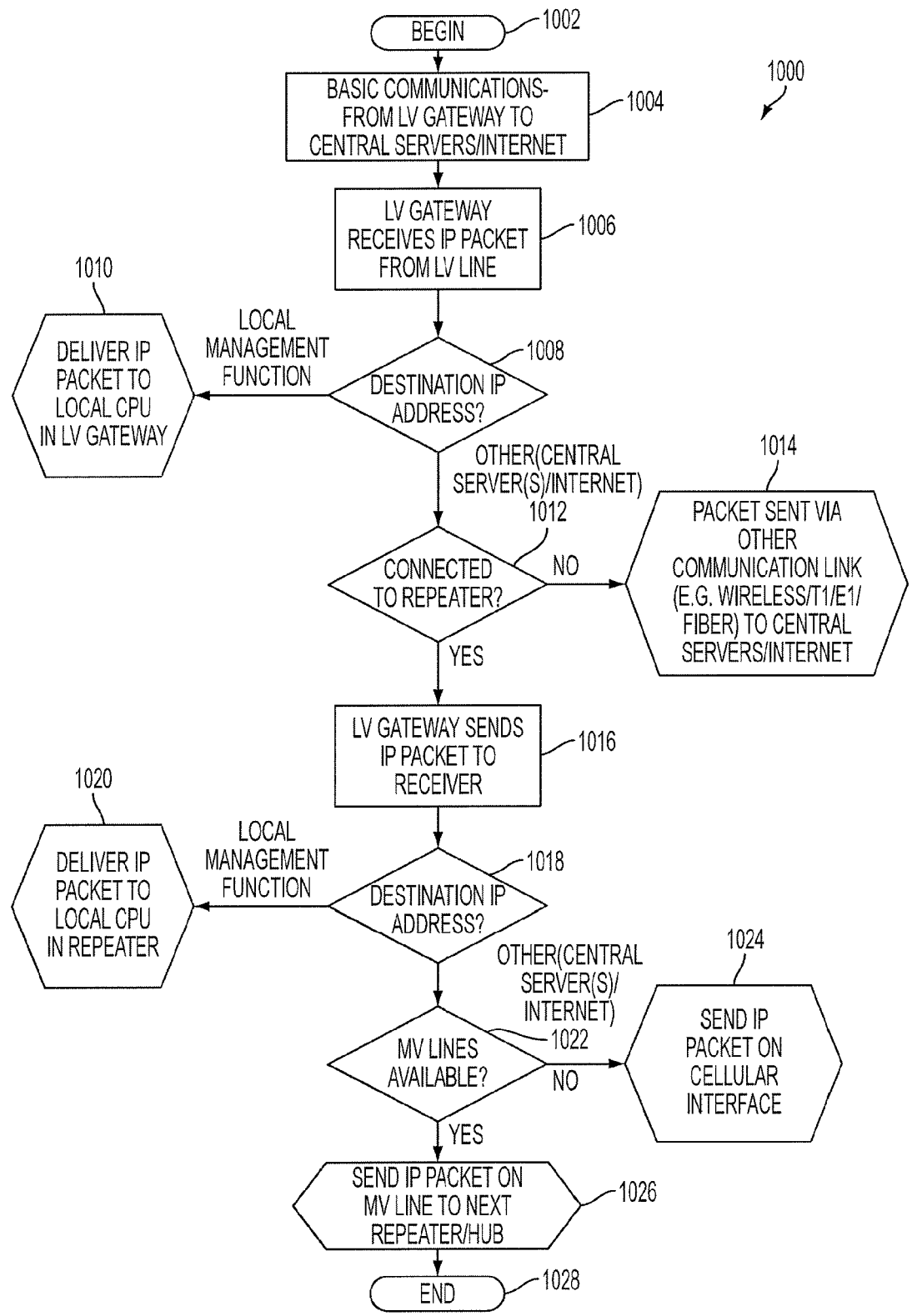
FIG. 10 depicts an exemplary flow diagram illustrating exemplary basic communications of an exemplary powerline communications (PLL) and/or broadband over powerline (BPL) system environment according to an exemplary embodiment.

FIG. 10 depicts an exemplary flow diagram 1000 illustrating an exemplary basic communications process of an exemplary powerline communications (PLC) and/or broadband over powerline (BPL) system environment according to an exemplary embodiment of the present invention.

According to an exemplary embodiment, all communications of flow diagram 1000 may use an IP-over-Powerline mechanism to provide OSI layer 1 and layer 2 communications (i.e., e.g., layers as defined by, e.g., but not limited to, the International Telecommunications Union (ITU), ITU-T/ISO 7-layer model X.200, etc.). According to an exemplary embodiment, the communications infrastructure may provide various capabilities, such as, e.g., but not limited to, including:

1) uni-casting of messages;
2) broadcasting and/or multicasting of data;
3) supporting virtual private networking (VPN);
4) providing quality-of-service (QoS) aware transport of data;
5) implementing, e.g., but not limited to, all, repeater components 102-106, 122 such as may be implemented as bridges and/or may run, e.g., but not limited to, a spanning-tree-protocol such as, e.g., but not limited to, IEEE Standard 802.1D, to prevent loops;
6) operating the LV Gateway 130 as, e.g., but not limited to, a bridge and/or a router, etc., depending on choices made during network design; and/or
7) equipping, e.g., but not limited to, all MIUs 132, 134 and/or LV user devices 136, 138 with capabilities such as, e.g., but not limited to, acquiring OSI Layer 3 address information, automatically, etc. According to an exemplary embodiment, Layer 3 addresses may be, e.g., but are not limited to, IP version 4 (IETF RFC-791), or IP version 6 (RFC 2460), etc.

According to an exemplary embodiment, each repeater 102-106, 122 may contain, e.g., but not limited to, a management entity that may also automatically acquire an IP address, etc.

According to an exemplary embodiment, all components may be equipped with Network Management Service (NMS) 156 interfaces using, e.g., but not limited to, simple network management (SNMP), such as, e.g., but not limited to, SNMP v.3, etc.

According to an exemplary embodiment, e.g., but not limited to, all devices may be optionally equipped with, e.g., but not limited to, wireless interfaces 166-170 and/or MV and/or LV interfaces. According to an exemplary embodiment, in most cases, the wireless interface may be used, e.g., if the MV or LV communication paths are not available for, e.g., but not limited to, a reason of failure of that path in the network.

According to an exemplary embodiment, the transition between use of wireless and/or LV/MV BPL or PLC communications may be transparent to the system as whole, except that the central server 156 may be notified whenever, e.g., but not limited to, any communication interface has failed, etc.

According to an exemplary embodiment, flow diagram 1000 may begin with 1002 and may continue immediately with 1004.

In 1004, communications may be provided between LV gateway 130 and central server 156 over external IP network 158. From 1004, flow diagram 1000 may continue with 1006.

In 1006, LV gateway 130 may receive an IP packet from LV line 164. From 1006, diagram 1000 may continue with 1008.

In 1008, a destination IP address of the IP packet may be determined, and if a local management function is determined, then flow diagram 1000 may continue with 1010. If the destination IP address is determined to be associated with a host on another network, such as, e.g., but not limited to, central server 156 or another device on IP network 158, then flow diagram 1000 may continue with 1012.

In 1010, the IP packet may be delivered to a local device such as, e.g., but not limited to, a host or other device, such as, e.g., but not limited to, a CPU in LV gateway 130.

In 1012, it may be determined whether the gateway 130 is coupled to a repeater 106. If it is determined that the gateway 130 is coupled to a repeater 106, then diagram 1000 may continue with 1016. Otherwise, if not connected to a repeater 106, then flow diagram 1000 may continue with 1014.

In 1014, since gateway 130 is determined not to be connected to a repeater 106, the IP packet may be sent via another communications link, such as, e.g., but not limited to, a wireless link, a T1, an E1, a fiber, or other communications link, etc., to network 158, and e.g., but not limited to, central server 156, etc.

In 1016, LV gateway 130 may send the IP packet to the receiver. From 1016, flow diagram 1000 may continue with 1018.

In 1018, a destination IP address of the IP packet may be determined, and if a local management function is determined, then flow diagram 1000 may continue with 1020. If the destination IP address is determined to be associated with a host on another network, such as, e.g., but not limited to, central server 156 or another device on IP network 158, then flow diagram 1000 may continue with 1022.

In 1020, the IP packet may be delivered to a local device such as, e.g., but not limited to, a host or other device, such as, e.g., but not limited to, a CPU in repeater 106.

In 1022, it may be determined whether medium voltage (MV) lines are available, and if so, then diagram 1000 may continue with 1026, and if not, the diagram 1000 may continue with 1024.

In 1026, since MV lines are determined to be available, then the IP packet may be sent on the MV line to the next repeater 104 (or hub repeater or other repeater device). From 1026, diagram 1000 may continue with 1028 and may immediately end, according to one exemplary embodiment.

X. Exemplary Meter Reading Flow Processing

Figure 11:
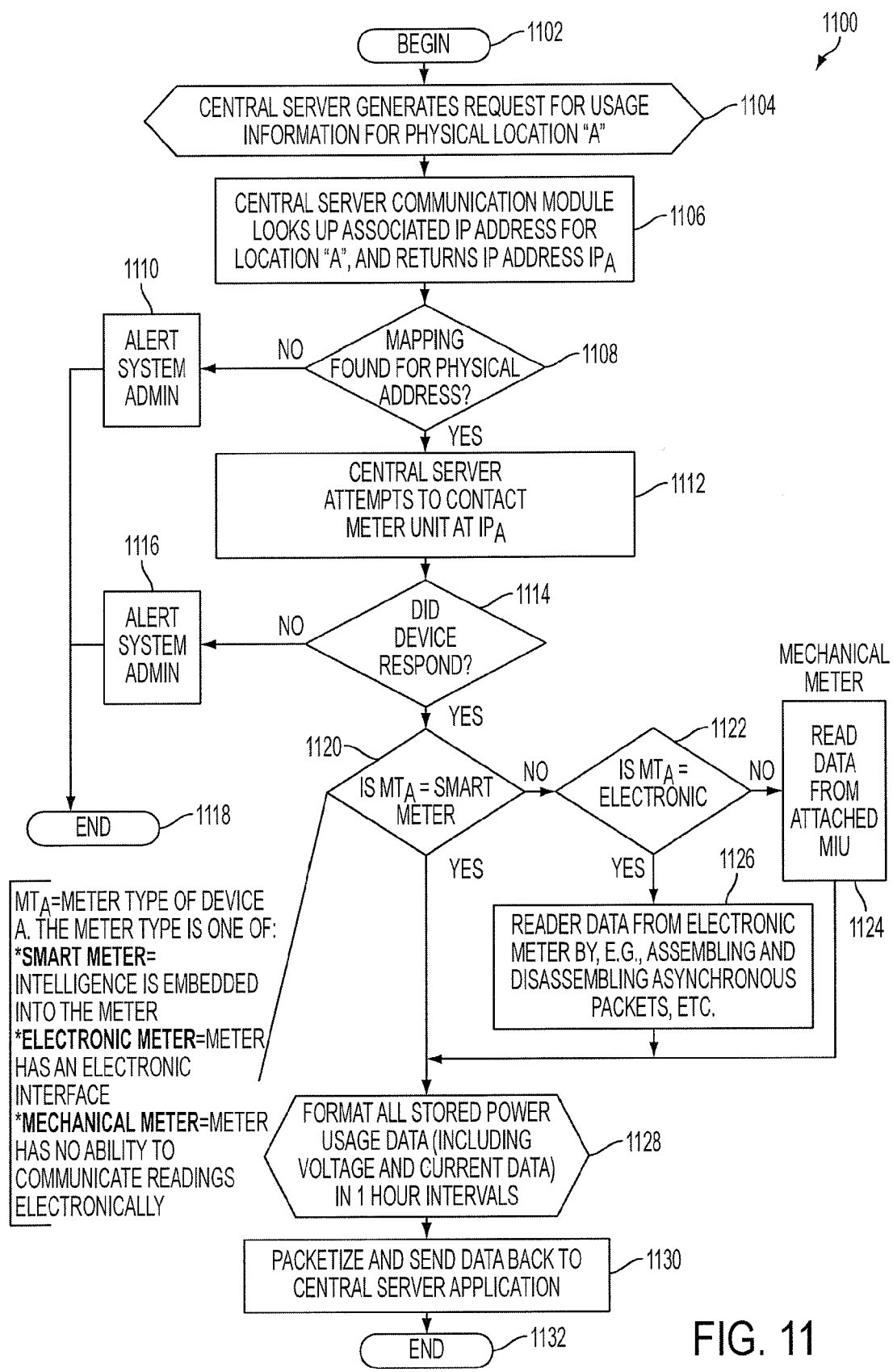
FIG. 11 depicts an exemplary flow diagram illustrating exemplary meter reading flow of various exemplary meter connection types in an exemplary powerline communications system environment according to an exemplary embodiment.

FIG. 11 depicts an exemplary flow diagram 1100 illustrating exemplary meter reading flow processing of various exemplary meter connection types, as illustrated and discussed above with references to FIGS. 3A, 3B and 3C, above, in an exemplary powerline communications system environment according to an exemplary embodiment of the present invention.

According to an exemplary embodiment, flow diagram 1100 may begin with 1102 and may continue immediately with 1104.

In 1104, central server 156 may generate a request for usage information for a given physical location "A" over, e.g., but not limited to, IP network 158 and/or a PLC or powerline carrier communications (PCC). From 1104, flow diagram 1100 may continue with 1106.

In 1106, in an exemplary embodiment, central server 156 may include a central server communications module which may look up an associated IP address for location "A" and may return an IP address IPA. From 1106, diagram 1100 may continue with 1108.

In 1108, it may be determined whether a mapping is found for the physical address associated with IP address IPA. If a mapping is not found for the physical address, then flow diagram 1100 may continue with 1110. If a mapping is found for the physical address, then flow diagram 1100 may continue with 1112.

In 1110, the an alert may be sent to system admin to notify the administrator that no mapping is found for the physical address. From 1110, flow diagram 1100 may continue with 1118.

In 1118, flow diagram 1100 may immediately end, in an exemplary embodiment.

In 1112, where a mapping is found for the physical address, central server 156 may attempt to contact an exemplary meter interface unit (MIU) 132 at IP address IPA. From 1112, flow diagram 1100 may continue with 1114.

In 1114, it may be determined whether the MIU device 132 to which the central server 156 has attempted to make contact, has responded. If it is determined that the MIU device has responded, then diagram 1100 may continue with 1120. If the MIU device 132 is determined not to have responded, then diagram 1100 may continue with 1116. In the case where a device such as MIU device 132 has not responded, when it should have in response to a query from the central server 156, it may be presumed that a power failure or other break in the communications link may have occurred, since communication to the meter device is unsuccessful.

In 1116, the an alert may be sent to system admin to notify the administrator that the MIU device 132 did not respond. From 1116, flow diagram 1100 may continue with 1118, where diagram 1100 may immediately end, in an exemplary embodiment.

TABLE 1

Meter Type of Device ($MT_A$)

| $MT_A$ | Description |
|---|---|
| Smart Meter | intelligence is embedded into the meter |
| Electronic Meter | meter has an electronic interface |
| Mechanical Meter | meter has no ability to communicate readings electronically |

In 1120, as illustrated in Table 1, it may be determined whether the meter type MTA of the meter is a smart meter. If the MTA is determined to be a smart meter (see discussion with reference to FIG. 3C above), then flow diagram 1100 may continue with 1128. A smart meter is a meter capable of communicating with the central server 156, in one exemplary embodiment. Conventionally, it is impracticable to presume that meters will be upgraded or replaced with an intelligent meter, however, in the case of new construction, a meter capable of communications could be used to provide such smart meter functionality as data storage, access and communications transmission capabilities. If the MTA is determined not to be a smart meter, then flow diagram 1100 may continue with 1122.

In 1122, as shown in Table 1, it may be determined whether the MTA of the meter is an electronic meter. If the MTA is determined to be an electronic meter (see discussion with reference to FIG. 3A above), then flow diagram 1100 may continue with 1126.

If the MTA is determined not to be an electronic meter (and since previously it was also determined that the MTA was not a smart meter), then it may be determined that the MTA of the meter is a mechanical meter, and then flow diagram 1100 may continue with 1124.

In 1124, since the MTA of the meter is determined to be mechanical, data may not be read directly from the meter, but data may be read from an attached meter interface unit (MIU) 134 as described above with reference to FIG. 3B. According to an exemplary embodiment, the MIU 134 may communicate with the central server 156 via, e.g., but not limited to, any of various well known communications methods, such as, e.g., but not limited to, packet communications protocols, and by communicating may provide data captured regarding the meter (which may have been previously obtained, monitored, and/or stored on the MIU device, as described above with reference to an exemplary embodiment. From 1126, flow diagram 1100 may continue with 1128, according to one exemplary embodiment.

In 1126, since the MTA of the meter is electronic, data may be read from the electronic meter by, e.g., but not limited to, assembling and disassembling asynchronous packets, etc., according to an exemplary embodiment using asynchronous communications. From 1126, flow diagram 1100 may continue with 1128, according to one exemplary embodiment.

In 1128, according to one exemplary embodiment, power usage data may be captured, stored, analyzed and/or formatted. According to an exemplary embodiment, power usage data may include, e.g., but is not limited to, voltage and/or current data, etc. According to one exemplary embodiment, power usage data may be obtained and/or stored according to intervals such as, e.g., but not limited to, on periodic or aperiodic intervals, such as, e.g., but not limited to, hourly, daily, weekly, monthly, etc. According to one exemplary embodiment, various data may be obtained by polling. According to another exemplary embodiment, data may be captured and/or stored on the MIU device and/or smart meter, and may then be sent to central server 156 on, e.g., but not limited to, a periodic, or predetermined basis, and failure to receive such transmissions in 1114, may be evidence to the central server 156 of potential network and/or power failure, worthy of further troubleshooting. From 1128, flow diagram 1100 may continue with 1130, according to one exemplary embodiment.

In 1130, data may be processed including, e.g., but not limited to, packetized, for transmission to central server 156 for further analysis and/or storage. From 1130, according to one exemplary embodiment, diagram 1100 may continue with 1132.

In 1132, according to an exemplary embodiment, diagram 1100 may immediately end.

XI. Exemplary Remote Disconnect Process

Figure 12:
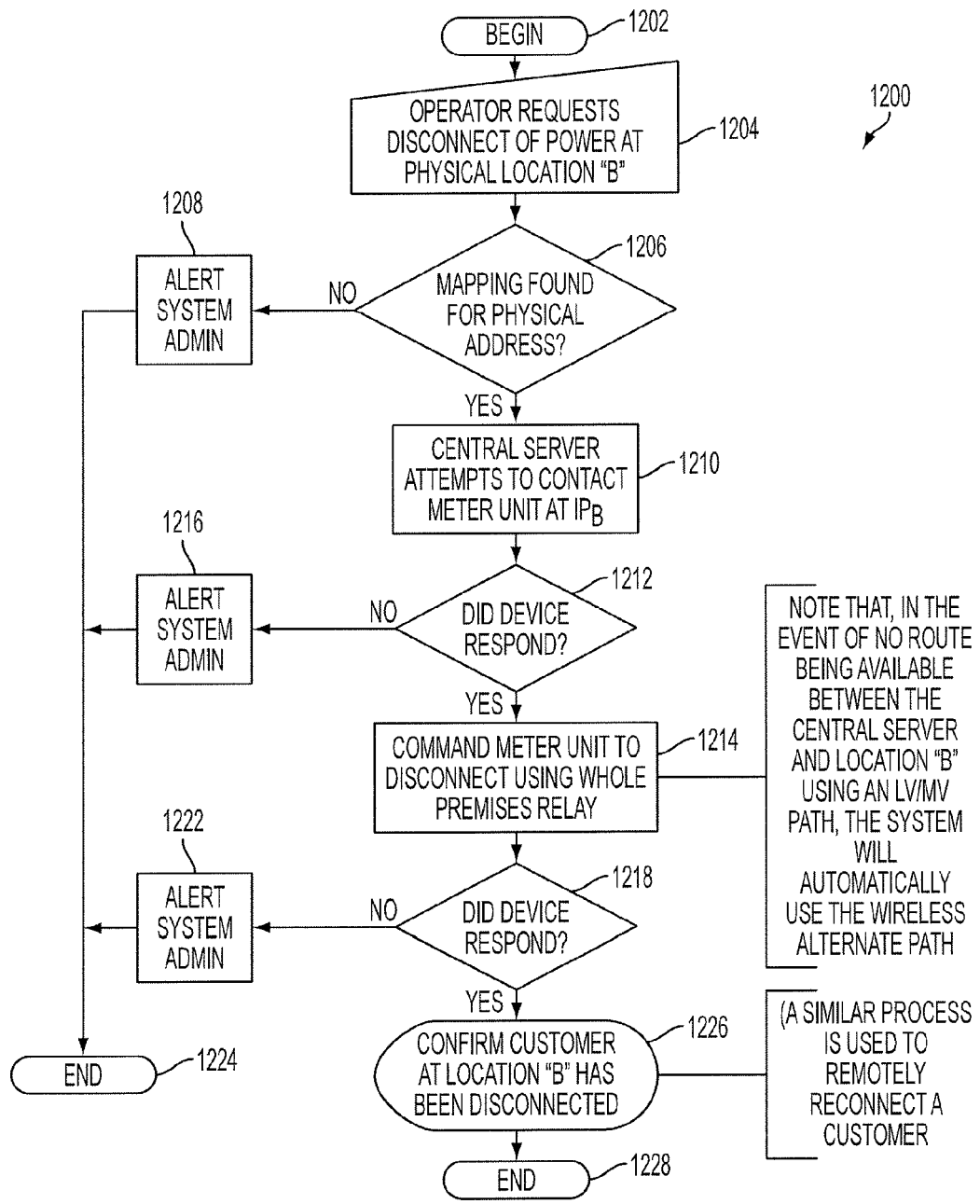
FIG. 12 depicts an exemplary flow diagram illustrating an exemplary remote disconnect process of an exemplary powerline communications system environment according to an exemplary embodiment.

FIG. 12 depicts an exemplary flow diagram 1200 illustrating an exemplary remote disconnect process of an exemplary powerline communications system environment according to an exemplary embodiment of the present invention. According to an exemplary embodiment, suppose a customer at a location "B" wishes to disconnect power at the location.

According to an exemplary embodiment, flow diagram 1200 may begin with 1202 and may continue immediately with 1204.

In 1204, according to one exemplary embodiment, an operator may request disconnect of power at a given location "B". According to an exemplary embodiment, suppose that a customer is on vacation and has forgotten to disconnect their air conditioner, and would like to cut it off remotely, this is one exemplary scenario where one might want to remotely disconnect power. In another exemplary embodiment, suppose that peak power demand needs exceed available power supply capacity, in such situations, rolling blackouts have been used by power companies to deal with the demand/supply imbalance. According to one exemplary embodiment, particular devices such as, e.g., electric hot water heaters might not be critically needed in the same way that a hospital emergency rooms equipment might be needed, and particular devices could be remotely disconnected according to an exemplary embodiment, using exemplary systems and methods described herein. From 1204, flow diagram 1200, according to an exemplary embodiment, may continue with 1206.

In 1206, it may be determined whether a mapping is found for the physical address associated with given location "B" where remote disconnect is desired. According to an exemplary embodiment, if such a mapping is found, then flow diagram 1200 may continue with 1210. According to an exemplary embodiment, if such a mapping is not found for the physical address of location "B", then flow diagram 1200 may continue with 1208.

In 1208, where no mapping has been found for the physical location B, then the system administrator may be alerted of this lack of mapping, in an exemplary embodiment. From 1208, flow diagram 1200 may continue with 1224.

In 1210, where a mapping has been found for physical address of location "B", the central server 156 may attempt to contact a meter unit (directly for a smart meter, or via a meter interface unit (MIU) as described above for meters lacking communications intelligence). From 1210, flow diagram 1200 may continue with 1212.

In 1212, it may be determined whether the meter device has responded to the query of the central server 156 from 1210. As will be apparent to those skilled in the art, the polling and answering request/response communications handshaking may be accomplished via other methods of communication such as periodic communication, etc. If it is determined that the meter device has not responded to the request of central server 1210, then flow diagram 1200 may continue with 1216. If the meter device does respond, then flow diagram 1200 may continue with 1214.

In 1216, where the meter device has not responded to the query of the central server 156, it may be presumed that power or the network may have failed and the system administrator may be notified. From 1216, flow diagram 1200 may continue with 1224.

In 1214, where the meter device has responded, the central server 156, or other network device, being operated by an operator may command the meter unit to disconnect power to one or more devices serviced by the given meter at location "B" using, e.g., but not limited to, a relay, and/or other switching mechanism enabling remote disconnect of power to the power demanding device at location "B." According to one exemplary embodiment, the operator may disconnect, e.g., but not limited to, all power at the location "B," according to an exemplary embodiment. In the event of no communications route being available between the central server 156 and location "B" using a LV/MV powerline path, the system, according to one exemplary embodiment, may, e.g., but not limited to, automatically use an alternate, such as, e.g., but not limited to, a wireless alternate path for communications to the location "B" for remote disconnect communication. From 1214, according to an exemplary embodiment, flow diagram 1200 may continue with decision 1218.

In 1218, it may be determined whether the meter device has responded to the disconnect request sent by the operator to location "B." If the meter device has responded to the operator's disconnect request, then flow diagram 1200 may continue with 1226. If the meter device does not respond to the disconnect request of the operator, then in an exemplary embodiment, diagram 1200 may continue with 1222.

In 1222, where the meter device has not responded to the disconnect request of the operator or central server 156, it may be presumed that power or the network may have failed or that that disconnect may not have been successful, and the system administrator may be notified for, e.g., but not limited to, further troubleshooting. From 1222, flow diagram 1200 may continue with 1224.

In 1224, flow diagram 1200 may immediately end, according to one exemplary embodiment.

In 1226, where the meter device has responded to the remote disconnect command of the operator, then the meter device can confirm that the customer at location "B" has been disconnected, and any customer service related, and/or other processing necessary relating to, e.g., but not limited to, service level agreement (SLA), may be undertaken, as well as the storage of the occurrence of the disconnect of location "B" may be recorded, and/or why the disconnect was requested, when and/or how long the disconnect occurred. As will be apparent to those skilled in the relevant art, a similar process may be used to remotely Reconnect a disconnected user's power, by having the operator interact with the remote meter device to toggle the power back on at location "B" at the request of the customer, and or otherwise (such as, e.g., but not limited to, at the power company's request, etc. From 1226, flow diagram may continue with 1228.

In 1228, according to an exemplary embodiment, diagram 1200 may immediately end.

XII. Exemplary Customer Use of Communications

Figure 13:
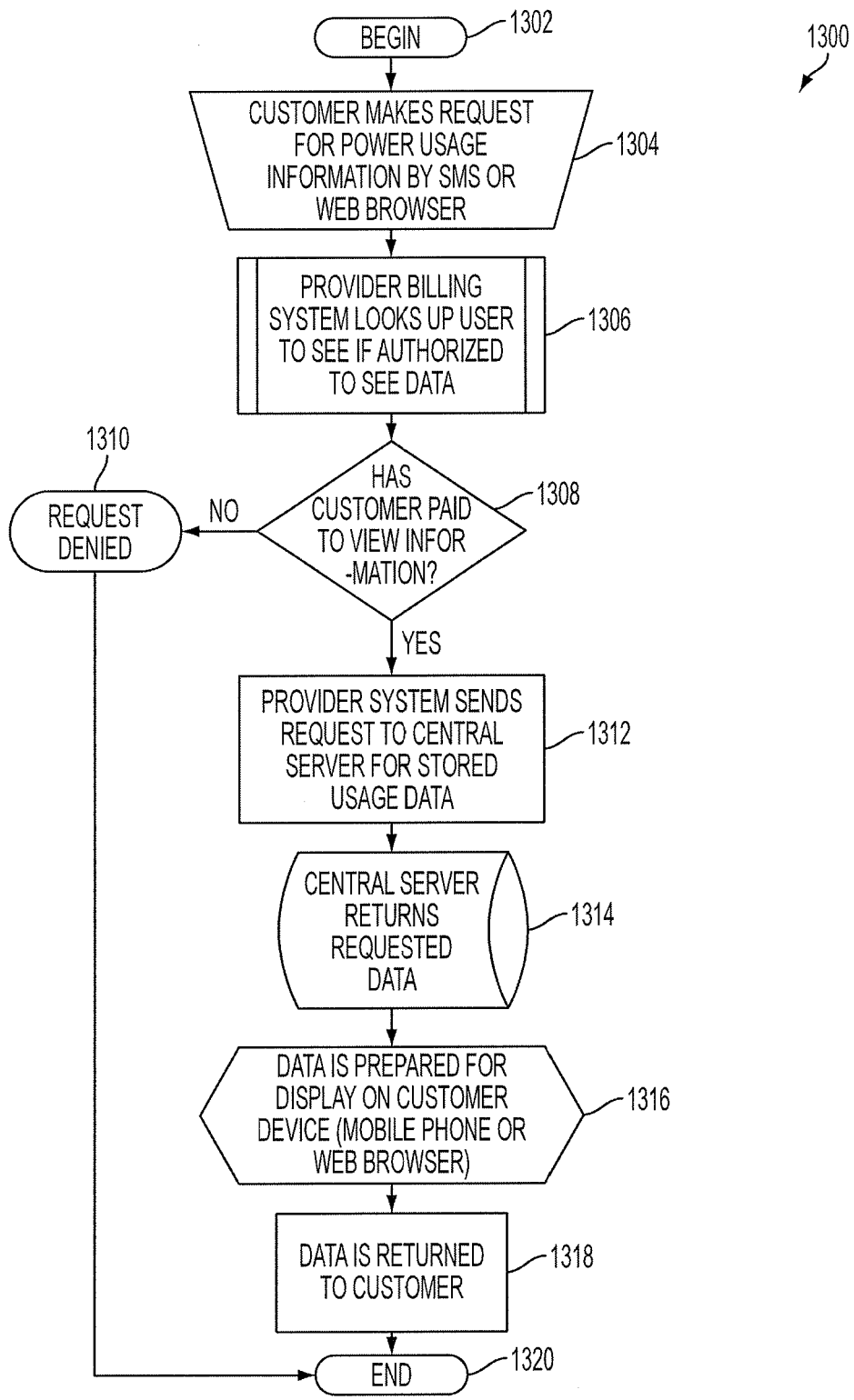
FIG. 13 depicts an exemplary flow diagram illustrating an exemplary process by which an exemplary customer may obtain access to data from an exemplary central server over an exemplary powerline communications system environment according to an exemplary embodiment.

FIG. 13 depicts an exemplary flow diagram 1300 illustrating an exemplary process by which an exemplary customer may obtain access to data from an exemplary central server 156 over an exemplary powerline communications system environment according to an exemplary embodiment of the present invention. Suppose for example that a customer wishes to obtain power usage information for such purposes as, e.g., but not limited to, auditing one's own power usage as compared with, e.g., a utility bill from a power company.

According to an exemplary embodiment, flow diagram 1300 may begin with 1302 and may continue immediately with 1304.

In 1304, a customer may make a request, according to an exemplary embodiment, for the power usage information. According to one exemplary embodiment, suppose the customer wishes to obtain the information by, e.g., but not limited to, a message, the internet, a web browser interface, a simple messaging system (SMS), a multimedia messaging system (MMS), an email, an instant message (IM), a wireless communication, a packet communication, etc. From 1304, flow diagram 1300 may continue with 1306.

In 1306, according to an exemplary embodiment, a provider billing system may look up a user's profile records to see if the user is authorized to access the requested data, according to an exemplary embodiment. For example, access to such information may be restricted to certain users. Further, access to such information might be available, only if a particular fee, whether one time, or periodic or a periodic subscription fee is charged. From 1306, diagram 1300 may continue with 1308.

In 1308, it may be determined whether the customer is entitled to the requested data. For example, it may be determined whether the customer has paid a fee that may be required to access such information. If it is determined that the requesting customer is authorized to obtain access to the requested information, then flow diagram 1300 may continue with 1312. If instead it is determined that the customer is not authorized to access the information, then flow diagram 1300 may continue with 1310.

In 1310, according to an exemplary embodiment, the request to access the information may be denied and diagram 1300 may continue with 1320.

In 1312, where the requesting user is authorized to access the requested information, the system may request the requested data from storage such as, e.g., by querying the central server 156 database or other storage system for the requested data record(s) and/or field(s). From 1312, flow diagram 1300 may continue with 1314.

In 1314, in response to the query for authorized information, the requested data may be obtained from storage and may be provided (by for example the central server 156 in an exemplary embodiment), to be provided to the authorized requester of the data or information about power usage. From 1314, diagram 1300 may continue with 1316.

In 1316, data may be prepared for display on a customer device such as, e.g., but not limited to, a customer computing device, communications device, telephony device, personal digital assistant (PDA) device, mobile device, portable device, notebook, laptop, thin client, web browser based workstation or device, etc. for viewing by the requesting authorized user. From 1316, the flow diagram 1300 may continue with 1318. In an exemplary embodiment, the data may be, e.g., but not limited to, formatted, modified for viewing, encrypted, secured, etc. for transmission to the requester.

In 1318, the requested data as formatted for delivery may be provided to the requesting user. According to an exemplary embodiment, the customer may be able to gain access in substantially real-time, on, e.g., but not limited to, on a daily basis, etc., to determine usage, e.g., between, conventional billing cycles, and/or more frequently than conventionally available, for example, etc. By providing more realtime information, the user may be permitted to change their usage habits and to see realtime effects on their power usage.

In 1320, diagram 1300 may immediately end, according to one exemplary embodiment.

XIII. Exemplary Power Outage Processing

Figure 14:
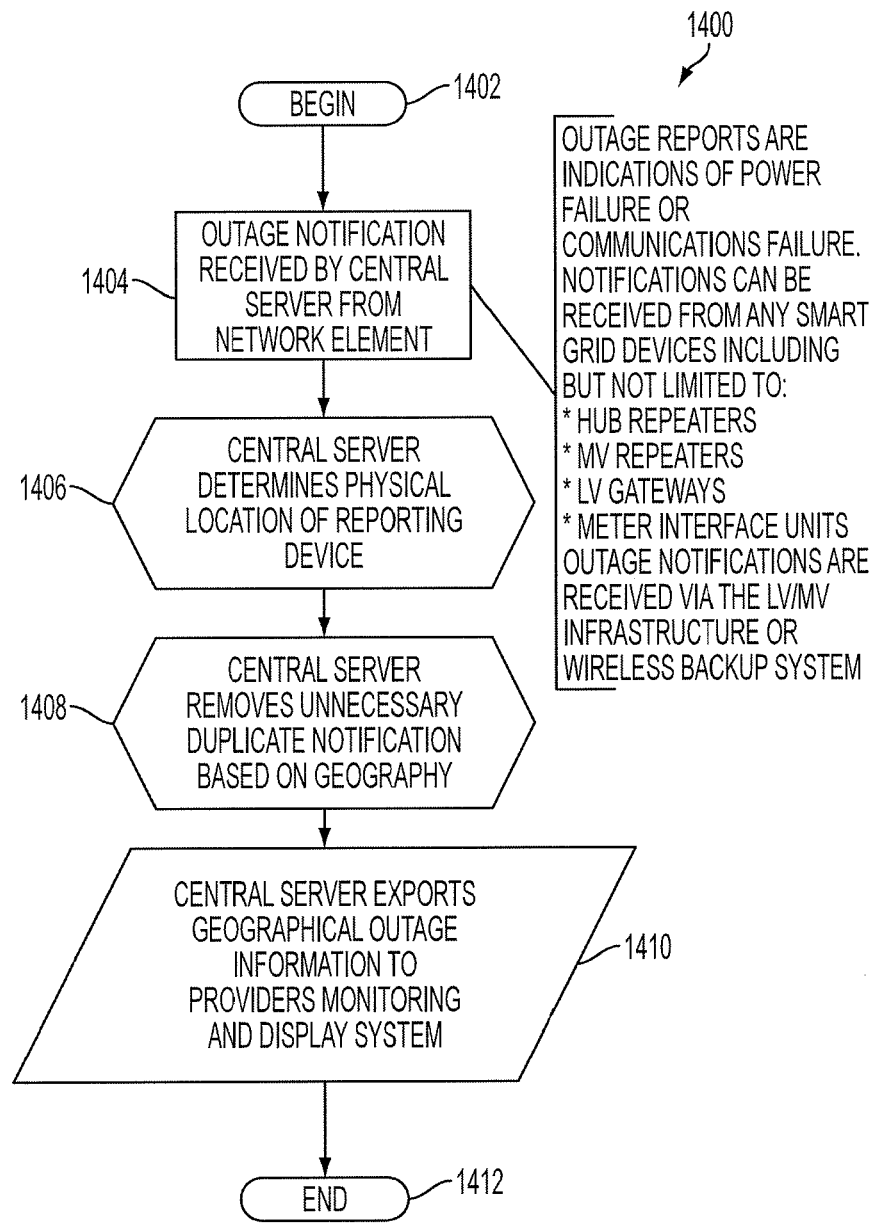
FIG. 14 depicts an exemplary flow diagram illustrating an exemplary process of outage management setting forth exemplary monitoring, notifying and reporting of outages using an exemplary powerline communications system environment according to an exemplary embodiment.

FIG. 14 depicts an exemplary flow diagram 1400 illustrating an exemplary process of outage management setting forth an exemplary embodiment of a process by which one may monitor, notify and/or report, etc., a power outage using an exemplary power line carrier communications (PCC) system environment according to an exemplary embodiment of the present invention.

According to an exemplary embodiment, flow diagram 1400 may begin with 1402 and may continue immediately with 1404.

In 1404, an outage notification may have been received by, e.g., but not limited to, a central server 156 from e.g., but not limited to, any network element (NE) such as, e.g., but not limited to, a meter interface unit (MIU) 132, a meter device 312, a gateway, a router, a bridge, a network device, a communications device, a computing device, an adapter, etc. According to an exemplary embodiment, outage reports may include, e.g., but are not limited to, indications of a power failure and/or a communications failure. According to an exemplary embodiment, such notifications may be received when a device requests data via, e.g., but not limited to a poll, a request, and/or handshaking, etc., and an expected poll response, request response, and/or handshake is not received, etc. According to an exemplary embodiment, notifications can be received from any of various devices including, e.g., but not limited to, Smart Grid devices, which may include, e.g., but are not limited to: hub(s), repeater(s), hub repeater(s), MV repeater(s), LV gateway(s), meter interface unit(s) (MIUs), intelligent devices, communications devices, computing devices, etc. According to an exemplary embodiment, outage notifications may be received via, e.g., but not limited to, the LV/MV infrastructure and/or an alternate channel, such as, e.g., but not limited to, a wireless backup system, etc. From 1404, flow diagram 1400 may continue with 1406.

In 1406, according to one exemplary embodiment, central server 156, according to an exemplary embodiment, may determine a physical location of a reporting device which may be providing the outage notification received in 1404. From 1406, diagram 1400 may continue with 1408.

In 1408, according to an exemplary embodiment, the central server 156 may remove unnecessary, and/or duplicate notifications, based on a given geography, etc., and/or based on an understanding of the network and/or power supplier usage area, hierarchy, etc. From 1408, flow diagram 1400 may continue with 1410.

In 1410, according to an exemplary embodiment, the central server 156 may, e.g., but not limited to, export geographical outage information to providers monitoring a given area, and/or may provide such information to a display system for review and/or action such as, e.g., but not limited to, real-time, repair, remedial action and/or maintenance action. Further, according to an exemplary embodiment, the occurrence of a power failure may be provided to, e.g., a customer, a related entity, a regulatory entity, etc. From 1410, according one exemplary embodiment, flow diagram 1400 may continue with 1412.

In 1412, in an exemplary embodiment, flow diagram 1400 may immediately end.

IX. Exemplary Processing and Communications Embodiments

Figure 8:
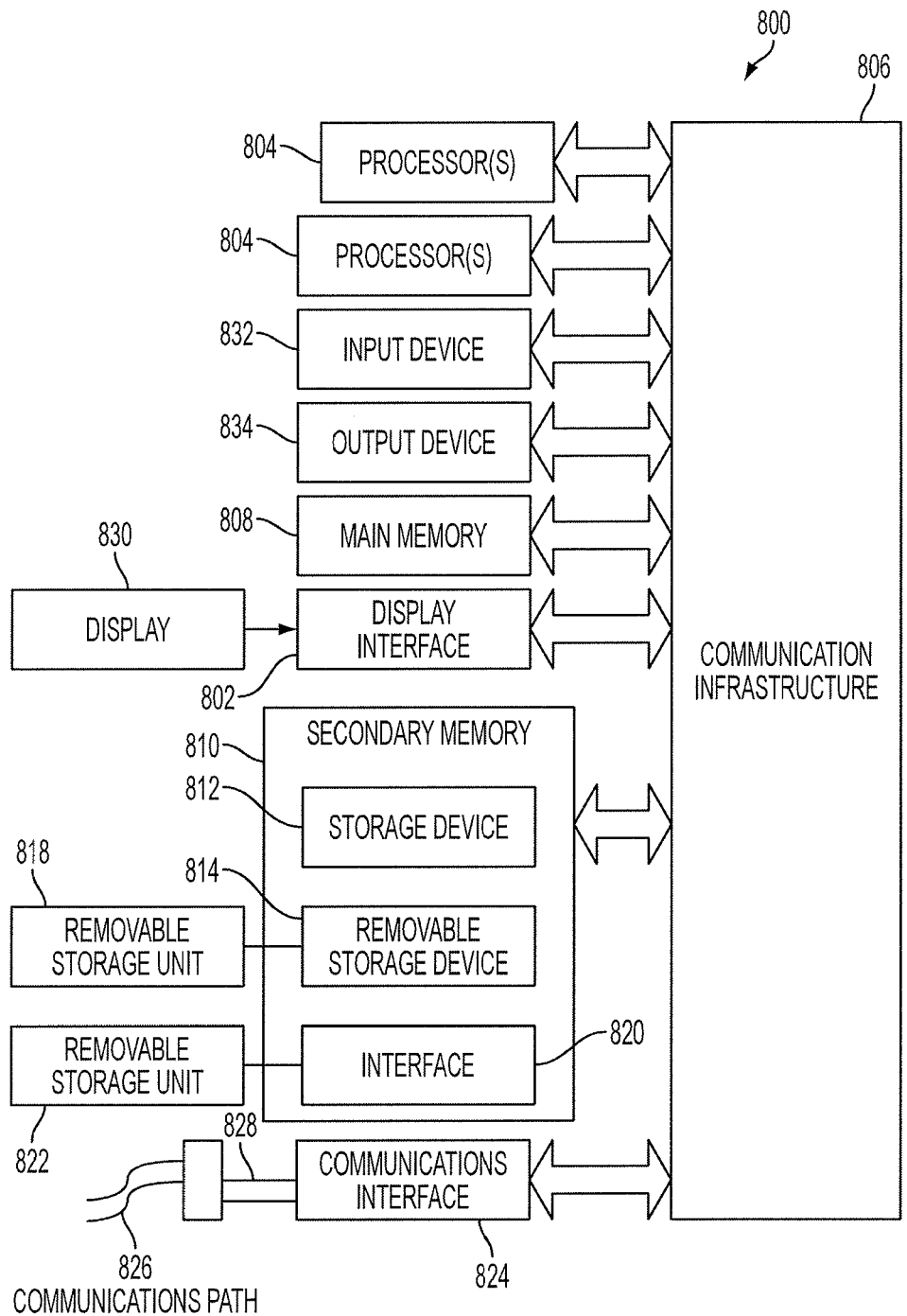
FIG. 8 shows an exemplary embodiment of a computer system that may be used in association with, in connection with, and/or in place of certain components in accordance with the present embodiments.

FIG. 8 depicts an exemplary embodiment of a computer system 800 that may be used in association with, in connection with, and/or in place of, but not limited to, any of the foregoing components and/or systems.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 800 is shown in FIG. 8, depicting an exemplary embodiment of a block diagram of an exemplary computer system useful for implementing the present invention. Specifically, FIG. 8 illustrates an example computer 800, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/,etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 800 is shown in FIG. 8. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 8.

The computer system 800 may include one or more processors, such as, e.g., but not limited to, processor(s) 804. The processor(s) 804 may be connected to a communication infrastructure 806 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 800 may include a display interface 802 that may forward, e.g., but not limited to, graphics, text, and other data, etc., from the communication infrastructure 806 (or from a frame buffer, etc., not shown) for display on the display unit 830.

The computer system 800 may also include, e.g., but may not be limited to, a main memory 808, random access memory (RAM), and a secondary memory 810, etc. The secondary memory 810 may include, for example, (but not limited to) a hard disk drive 812 and/or a removable storage drive 814, representing a floppy diskette drive, a magnetic tape drive, an optical disk drive, a compact disk drive CD-ROM, etc. The removable storage drive 814 may, e.g., but not limited to, read from and/or write to a removable storage unit 818 in a well known manner. Removable storage unit 818, also called a program storage device or a computer program product, may represent, e.g., but not limited to, a floppy disk, magnetic tape, optical disk, compact disk, etc. which may be read from and written to by removable storage drive 814. As will be appreciated, the removable storage unit 818 may include a computer usable storage medium having stored therein computer software and/or data.

In alternative exemplary embodiments, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 822 and interfaces 820, which may allow software and data to be transferred from the removable storage unit 822 to computer system 800.

Computer 800 may also include an input device such as, e.g., (but not limited to) a mouse or other pointing device such as a digitizer, and a keyboard or other data entry device (none of which are labeled).

Computer 800 may also include output devices, such as, e.g., (but not limited to) display 830, and display interface 802. Computer 800 may include input/output (I/O) devices such as, e.g., (but not limited to) communications interface 824, cable 828 and communications path 826, etc. These devices may include, e.g., but not limited to, a network interface card, and modems (neither are labeled). Communications interface 824 may allow software and data to be transferred between computer system 800 and external devices. Examples of communications interface 824 may include, e.g., but may not be limited to, a modem, a network interface (such as, e.g., an Ethernet card), a communications port, a Personal Computer Memory Card International Association (PCMCIA) slot and card, etc. Software and data transferred via communications interface 824 may be in the form of signals 828 which may be electronic, electromagnetic, optical or other signals capable of being received by communications interface 824. These signals 828 may be provided to communications interface 824 via, e.g., but not limited to, a communications path 826 (e.g., but not limited to, a channel). This channel 826 may carry signals 828, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 814, a hard disk installed in hard disk drive 812, and signals 828, etc. These computer program products may provide software to computer system 800. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 808 and/or the secondary memory 810 and/or removable storage units 814, also called computer program products. Such computer programs, when executed, may enable the computer system 800 to perform the features of the present invention as discussed herein. In particular, the computer programs, when executed, may enable the processor 804 to provide a method to resolve conflicts during data synchronization according to an exemplary embodiment of the present invention. Accordingly, such computer programs may represent controllers of the computer system 800.

In another exemplary embodiment, the invention may be directed to a computer program product comprising a computer readable medium having control logic (computer software) stored therein. The control logic, when executed by the processor 804, may cause the processor 804 to perform the functions of the invention as described herein. In another exemplary embodiment where the invention may be implemented using software, the software may be stored in a computer program product and loaded into computer system 800 using, e.g., but not limited to, removable storage drive 814, hard drive 812 or communications interface 824, etc. The control logic (software), when executed by the processor 804, may cause the processor 804 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc. Bluetooth is an emerging wireless technology promising to unify several wireless technologies for use in low power radio frequency (RF) networks. IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.11g-2003, etc.), etc.

CONCLUSION

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A system for providing power line communications, comprising:
   a repeater for repeating power line communication signals, the repeater comprising a module system operable to provide an alternative communications connection; and
   a coupler system operable to provide a communications interface between the repeater and an electric power line, the coupler system comprising a plurality of insulation and impedance sleeves,
   wherein the repeater is operable to repeat received power line communication signals and transmit repeated power line communication signals having a strengthened signal to noise ratio.

2. The system of claim 1, wherein the electric power line comprises a plurality of wires, wherein the transmitted power line communication signals are transmitted on the same wire of the electric power line.

3. The system of claim 2, wherein the power line communication signals are received on a first frequency band of the same wire and are transmitted on a second frequency band of the same wire.

4. The system of claim 1, wherein the electric power line comprises a plurality of wires, wherein the received power line communication signals are received on a first wire of the electrical power line and wherein the transmitted power line communication signals are transmitted on a second wire of the electric power line.

5. The system of claim 4, wherein the power line communication signals are received on a first frequency band of the first wire and are transmitted on a second frequency band on the second wire.

6. The system of claim 1, wherein the received power line communication signals are received from the electric power line and the repeater determines whether to transmit the received power line communication signals over the electric power line or through the alternative communications connection.

7. The system of claim 1, wherein the repeater receives signals from the alternative communications connection and transmits the received signals as power line communication signals on the electric power line.

8. The system of claim 1, wherein the alternative communications connection comprises any one of:
   a high speed connection via a high speed interface;
   a low speed connection via a low speed interface;
   an RS232 interface;
   an RS485 interface;
   an optical interface;
   a wireless interface;
   an Ethernet interface;
   cellular interface;
   a Groupe Spécial Mobile (GSM) base transceiver stations; and/or
   a code division multiple access (CDMA) wireless network.

9. The system of claim 1, wherein the electric power line is a medium voltage (MV) electric power line, wherein a first insulation and impedance sleeve of the plurality of insulation and impudence sleeves is for connecting to the medium voltage (MV) electric power line, and wherein a second insulation and impedance sleeve of the plurality of insulation and impedance sleeves is for connecting to a low voltage (LV) electric power line.

10. The system of claim 1, wherein the electric power line comprises a plurality of wires, wherein the power line communication signals are received on a first wire of the plurality of wires, wherein the repeater determines whether to transmit the received power line communication signals through a second wire of the plurality of wires or through the alternative communications connection if connectivity with another repeater is lost over the electric power line.

11. A meter interface unit (MIU) operable to provide remote meter reading, comprising:
   a meter data port operable to communicate with a meter, the meter connected to a load side of an electric power line;
   a processing system to receive meter data signals from the meter through the meter data port, to convert the received meter data signals to power line communication signals and to transmit the power line communication signals to a line side of the electric power line; and
   a load side interface to connect the meter interface unit to the load side of the electrical power line; and
   wherein the processing system:
      provides remote load management through the load side interface,
      receives load disconnect and/or connect instructions from the line side of the electrical power line, and
      sends load disconnect and/or connect instructions through the load side interface.

12. The meter interface unit of claim 11, wherein the MIU is operable to communicate with the meter and one or more additional meters, wherein the processing system further to receive a request over the electrical power line to read meter data signals from the meter and/or one or more of the additional meters, to receive meter data signals from the meter and/or one or more additional meters through the meter data port in accordance with the request, to convert the received meter data signals from the meter and/or one or more additional meters to power line communication signals in accordance with the request and to transmit the power line communication signals to the line side of the electric power line in accordance with the request.

13. The meter interface unit of claim 11, wherein the load disconnect and/or connect instructions are sent through the load side interface to the electrical power line.

14. An electrical power line system comprising:
the meter interface unit of claim 11;
a low voltage (LV) gateway switch to communicate with the meter interface unit over the electrical power line; and
a central network management system (NMS) server to communicate with the LV gateway switch through a communication interface, wherein the communication interface comprises at least one of: an Ethernet interface, a Fiber interface, a T1/E1 interface, an xDSL interface, and/or a GSM/GPRS interface.

15. The meter interface unit of claim 11, wherein the processing system to transmit the power line communication signals to the line side of the electric power line in real time.

16. An electrical power line system comprising:
the meter interface unit of claim 11;
a plurality of repeaters comprising a first repeater coupled to the meter interface unit over the electrical power line, the plurality of repeaters to repeat over the electrical power line the power line communication signals transmitted from the meter interface unit;
a hub repeater coupled to the plurality of repeaters to receive over the electrical power line the repeated power line communication signals and to transmit the received power line communication signals over an interface not coupled to the electrical power line; and
a central network management system (NMS) server to receive the power line communication signals from the hub repeater over the interface not coupled to the electrical power line.

17. An electrical power line monitoring system, comprising:
a sensor to measure at least one energy-related parameter of an electrical power line; and
an interface unit coupled to the sensor to receive measurements from the sensor, the interface unit comprising:
a data port operable to communicate with the sensor;
a processing system to receive the measurements from the sensor through the data port, to convert the received measurements to power line communication signals and to transmit the power line communication signals over the electric power line;
a low voltage (LV) gateway switch to communicate with the interface unit over the electrical power line; and
a central network management system (NMS) server to communicate with the LV gateway switch through a communication interface, wherein the communication interface comprises at least one of: an Ethernet interface, a Fiber interface, a T1/E1 interface, an xDSL interface, and/or a GSM/GPRS interface.

18. The electrical power line monitoring system of claim 17, wherein the interface unit comprises a local memory, wherein the processing system to receive periodic measurements from the sensor and to store the periodic measurements in the local memory.

19. The electrical power line monitoring system of claim 18, wherein the interface unit reads the stored measurements from the local memory and sends the read measurements over the electrical power line as power line communication signals.

20. The electrical power line monitoring system of claim 17, further comprising a switching mechanism coupled to the electrical power line to disconnect power from the electrical power line;
wherein the processing system further to receive disconnect instructions from the electrical power line and to send disconnect instructions to the switching mechanism in response to the received disconnect instructions.

21. The electrical power line monitoring system of claim 17, wherein the at least one energy-related parameter is at least one of voltage, current, power factor, energy usage or voltage fluctuations of the electrical power line.

22. The electrical power line monitoring system of claim 17, further comprising a smart meter, wherein the smart meter comprises the sensor and the interface unit, wherein the at least one energy-related parameter is at least one of energy usage or energy consumption.

* * * * *